US010496230B2

(12) United States Patent
Lee et al.

(10) Patent No.: US 10,496,230 B2
(45) Date of Patent: Dec. 3, 2019

(54) TOUCH CIRCUIT, TOUCH SENSING DEVICE, AND TOUCH SENSING METHOD

(71) Applicant: LG Display Co., Ltd., Seoul (KR)

(72) Inventors: HongJu Lee, Gyeonggi-do (KR); HyeongWon Kang, Seoul (KR); Youngwoo Jo, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 15/844,533

(22) Filed: Dec. 16, 2017

(65) Prior Publication Data

US 2018/0173342 A1    Jun. 21, 2018

(30) Foreign Application Priority Data

Dec. 20, 2016    (KR) .................. 10-2016-0175041

(51) Int. Cl.
*G06F 3/044*    (2006.01)
*G06F 3/041*    (2006.01)

(52) U.S. Cl.
CPC ............ *G06F 3/044* (2013.01); *G06F 3/0416* (2013.01); *G06F 3/0418* (2013.01); *G06F 3/0412* (2013.01)

(58) Field of Classification Search
CPC .... G06F 3/0412; G06F 3/0416; G06F 3/0418; G06F 3/044
See application file for complete search history.

(56) References Cited

U.S. PATENT DOCUMENTS

| 7,019,551 | B1* | 3/2006 | Biesterfeldt | ......... | H03K 17/163 |
| | | | | | 326/27 |
| 7,277,817 | B2* | 10/2007 | Hall | .................... | G01D 5/2405 |
| | | | | | 702/150 |
| 7,663,611 | B2* | 2/2010 | Fagard | .................. | G06F 3/0412 |
| | | | | | 345/174 |
| 7,843,249 | B2* | 11/2010 | Zhang | .................. | H03K 17/962 |
| | | | | | 324/658 |

(Continued)

FOREIGN PATENT DOCUMENTS

| CN | 103294297 A | 9/2013 |
| CN | 105138986 A | 12/2015 |

(Continued)

OTHER PUBLICATIONS

Office Action dated Sep. 19, 2018 with English translation issued in the corresponding Taiwanese Patent Application No. 106144912, pp. 1-10.

(Continued)

*Primary Examiner* — Michael J Jansen, II
(74) *Attorney, Agent, or Firm* — Polsinelli PC

(57) ABSTRACT

The present disclosure relates to a touch circuit, a touch sensing device, and a touch sensing method. According to the present disclosure, it is possible to obtain an accurate touch sensing result (the presence or absence of a touch and/or a touch position) by compensating for the unintentional change in the quantity of the charge corresponding to a signal obtained by driving a touch screen panel, so as to obtain sensing data in which the influence of the parasitic capacitance generated inside or outside the touch screen panel is reduced or eliminated, thereby improving capacitance-based touch sensing performance.

24 Claims, 20 Drawing Sheets

(56) References Cited

U.S. PATENT DOCUMENTS

| | | | | |
|---|---|---|---|---|
| 8,026,904 B2* | 9/2011 | Westerman | G06F 3/044 | 178/18.01 |
| 8,054,296 B2* | 11/2011 | Land | G06F 3/0418 | 178/18.01 |
| 8,058,937 B2* | 11/2011 | Qin | G06F 3/03547 | 178/18.06 |
| 8,068,097 B2* | 11/2011 | GuangHai | G06F 3/0227 | 345/168 |
| 8,089,383 B2* | 1/2012 | Williams | H03M 1/005 | 341/136 |
| 8,111,243 B2* | 2/2012 | Peng | G06F 3/044 | 345/173 |
| 8,120,584 B2* | 2/2012 | Grivna | G06F 3/016 | 345/169 |
| 8,144,125 B2* | 3/2012 | Peng | G06F 3/044 | 178/18.01 |
| 8,144,126 B2* | 3/2012 | Wright | G06F 1/3203 | 345/173 |
| 8,154,310 B1* | 4/2012 | Maharyta | G06F 3/0416 | 324/678 |
| 8,159,462 B1* | 4/2012 | Seguine | G06F 3/044 | 345/173 |
| 8,248,081 B2* | 8/2012 | Maharyta | G06F 3/03547 | 324/601 |
| 8,259,087 B2* | 9/2012 | Chen | G06F 3/044 | 178/18.06 |
| 8,446,158 B1* | 5/2013 | Jansson | H03K 17/9622 | 324/601 |
| 8,493,356 B2* | 7/2013 | Joharapurkar | G06F 3/0418 | 345/174 |
| 8,537,119 B1* | 9/2013 | Grivna | G06F 3/016 | 345/169 |
| 8,570,053 B1* | 10/2013 | Ryshtun | H03K 17/962 | 324/678 |
| 8,599,167 B2* | 12/2013 | Joharapurkar | G06F 3/0418 | 178/18.01 |
| 8,610,443 B1* | 12/2013 | Ryshtun | G06F 3/03545 | 324/683 |
| 8,614,693 B2* | 12/2013 | King | G06F 3/0416 | 345/174 |
| 8,711,120 B2* | 4/2014 | Hargreaves | G06F 3/045 | 178/18.08 |
| 8,717,302 B1* | 5/2014 | Qin | G06F 3/044 | 178/18.06 |
| 8,766,939 B2* | 7/2014 | Sobel | G06F 3/0416 | 178/18.06 |
| 8,786,295 B2* | 7/2014 | Chandra | G06F 3/044 | 324/686 |
| 8,803,813 B2* | 8/2014 | Xiaoping | G06F 1/32 | 178/18.01 |
| 8,816,984 B2* | 8/2014 | Hotelling | G06F 3/044 | 345/173 |
| 8,866,494 B2* | 10/2014 | Ryshtun | G06F 3/03545 | 324/616 |
| 8,902,172 B2* | 12/2014 | Peng | G06F 3/0416 | 345/173 |
| 8,947,373 B2* | 2/2015 | Kremin | G06F 3/0418 | 345/173 |
| 9,154,160 B2* | 10/2015 | Kremin | G06F 3/044 | |
| 9,189,116 B2* | 11/2015 | Cheng | G06F 3/044 | |
| 9,268,441 B2* | 2/2016 | Walsh | G06F 3/0416 | |
| 9,354,758 B2* | 5/2016 | Huang | G06F 3/044 | |
| 9,377,907 B2* | 6/2016 | Shahparnia | G06F 3/0418 | |
| 9,430,105 B2* | 8/2016 | Yao | G06F 3/044 | |
| 9,547,394 B2* | 1/2017 | Hotelling | G06F 3/0416 | |
| 9,658,722 B2* | 5/2017 | Schwartz | G06F 3/0418 | |
| 9,746,974 B2* | 8/2017 | Ellis | G06F 3/0416 | |
| 9,766,749 B2* | 9/2017 | Pan | G06F 3/0418 | |
| 9,778,804 B2* | 10/2017 | Liu | G06F 3/044 | |
| 9,857,921 B2* | 1/2018 | Pant | G06F 3/0418 | |
| 2004/0100450 A1* | 5/2004 | Choi | G06F 3/0412 | 345/173 |
| 2005/0109125 A1* | 5/2005 | Hall | G01D 5/2405 | 73/862.68 |
| 2006/0125717 A1* | 6/2006 | Fagard | G06F 3/0412 | 345/55 |
| 2007/0229466 A1* | 10/2007 | Peng | G06F 3/044 | 345/173 |
| 2007/0229468 A1* | 10/2007 | Peng | G06F 3/044 | 345/173 |
| 2007/0262962 A1* | 11/2007 | Xiaoping | G06F 1/32 | 345/173 |
| 2007/0262963 A1* | 11/2007 | Xiao-Ping | G06F 3/03547 | 345/173 |
| 2007/0296709 A1* | 12/2007 | GuangHai | G06F 3/0227 | 345/173 |
| 2008/0036473 A1* | 2/2008 | Jansson | G06F 3/03547 | 324/678 |
| 2008/0047764 A1* | 2/2008 | Lee | G08C 21/00 | 178/18.06 |
| 2008/0088594 A1* | 4/2008 | Liu | G06F 3/044 | 345/173 |
| 2008/0136792 A1* | 6/2008 | Peng | G06F 3/0416 | 345/174 |
| 2008/0150905 A1* | 6/2008 | Grivna | G06F 3/016 | 345/173 |
| 2008/0158174 A1* | 7/2008 | Land | G06F 3/0418 | 345/173 |
| 2008/0158182 A1* | 7/2008 | Westerman | G06F 3/0416 | 345/173 |
| 2008/0179112 A1* | 7/2008 | Qin | G06F 3/03547 | 178/18.06 |
| 2008/0196945 A1* | 8/2008 | Konstas | G06F 3/03547 | 178/18.03 |
| 2008/0277171 A1* | 11/2008 | Wright | G06F 1/3203 | 178/18.06 |
| 2009/0008161 A1* | 1/2009 | Jones | G06F 3/044 | 178/18.06 |
| 2009/0066674 A1* | 3/2009 | Maharyta | G06F 3/03547 | 345/178 |
| 2009/0108914 A1* | 4/2009 | Zhang | H03K 17/962 | 327/517 |
| 2009/0315850 A1* | 12/2009 | Hotelling | G06F 3/044 | 345/173 |
| 2009/0315851 A1* | 12/2009 | Hotelling | G06F 3/044 | 345/173 |
| 2010/0245286 A1* | 9/2010 | Parker | G06F 3/0416 | 345/174 |
| 2010/0283647 A1* | 11/2010 | Williams | H03M 1/005 | 341/135 |
| 2011/0115729 A1* | 5/2011 | Kremin | G06F 3/0418 | 345/173 |
| 2011/0186359 A1* | 8/2011 | Chen | G06F 3/044 | 178/18.06 |
| 2011/0261005 A1* | 10/2011 | Joharapurkar | G06F 3/0418 | 345/174 |
| 2011/0261007 A1* | 10/2011 | Joharapurkar | G06F 3/0418 | 345/174 |
| 2012/0043970 A1* | 2/2012 | Olson | G01R 27/2605 | 324/601 |
| 2012/0043973 A1* | 2/2012 | Kremin | G06F 3/044 | 324/658 |
| 2012/0050210 A1* | 3/2012 | King | G06F 3/0416 | 345/174 |
| 2012/0256868 A1* | 10/2012 | Choi | G06F 3/0416 | 345/174 |
| 2012/0256869 A1* | 10/2012 | Walsh | G06F 3/0416 | 345/174 |
| 2012/0268145 A1* | 10/2012 | Chandra | G06F 3/044 | 324/686 |
| 2012/0286800 A1* | 11/2012 | Maharyta | G06F 3/0416 | 324/603 |
| 2012/0287077 A1* | 11/2012 | Pant | G06F 3/044 | 345/174 |
| 2012/0293447 A1* | 11/2012 | Heng | G06F 3/044 | 345/174 |
| 2012/0319996 A1* | 12/2012 | Hotelling | G06F 3/044 | 345/174 |

(56) References Cited

U.S. PATENT DOCUMENTS

| | | | |
|---|---|---|---|
| 2013/0076675 A1* | 3/2013 | Shin | G06F 3/0416 345/173 |
| 2013/0176269 A1* | 7/2013 | Sobel | G06F 3/044 345/174 |
| 2014/0015746 A1* | 1/2014 | Hargreaves | G06F 3/044 345/157 |
| 2014/0085246 A1* | 3/2014 | Shahparnia | G06F 3/044 345/174 |
| 2014/0232690 A1* | 8/2014 | Huang | G06F 3/044 345/174 |
| 2014/0267151 A1* | 9/2014 | Ryshtun | G06F 3/03545 345/174 |
| 2014/0320172 A1* | 10/2014 | Hsu | H02M 11/00 327/103 |
| 2014/0375600 A1* | 12/2014 | Pan | G06F 3/044 345/174 |
| 2015/0029137 A1* | 1/2015 | Cheng | G06F 3/044 345/174 |
| 2015/0035787 A1* | 2/2015 | Shahparnia | G06F 3/044 345/174 |
| 2015/0054772 A1* | 2/2015 | Jain | G06F 3/0418 345/174 |
| 2015/0084876 A1* | 3/2015 | Schwartz | G06F 3/0418 345/173 |
| 2015/0177868 A1* | 6/2015 | Morein | G06F 3/044 345/174 |
| 2015/0227232 A1* | 8/2015 | Yao | G06F 3/044 345/174 |
| 2015/0235607 A1* | 8/2015 | Nakanishi | G06F 3/044 345/174 |
| 2015/0331535 A1* | 11/2015 | Li | G06F 3/044 348/174 |
| 2016/0026295 A1* | 1/2016 | Ogirko | G06F 3/0416 345/174 |
| 2016/0054829 A1* | 2/2016 | Ellis | G06F 3/0416 345/178 |
| 2016/0117017 A1* | 4/2016 | Kremin | G01R 27/2605 345/174 |
| 2016/0148034 A1* | 5/2016 | Kremin | G06K 9/0002 382/124 |
| 2016/0224163 A1 | 8/2016 | Kim et al. | |
| 2016/0357288 A1* | 12/2016 | Chao | G06F 3/044 |
| 2016/0357299 A1* | 12/2016 | Liu | G06F 3/044 |
| 2017/0003777 A1* | 1/2017 | Akhavan Fomani | G06F 3/044 |
| 2017/0371444 A9* | 12/2017 | Chao | G06F 3/044 |
| 2018/0052558 A1* | 2/2018 | Wang | G06F 3/0416 |
| 2018/0150168 A1* | 5/2018 | Jung | G06F 3/044 |
| 2018/0173342 A1* | 6/2018 | Lee | G06F 3/0418 |
| 2018/0300013 A1* | 10/2018 | Yang | G06F 3/0418 |

FOREIGN PATENT DOCUMENTS

| | | |
|---|---|---|
| CN | 205563523 U | 9/2016 |
| JP | 2007-179230 A | 7/2007 |
| JP | 2015-141556 A | 8/2015 |
| JP | 2016-122438 A | 7/2016 |
| TW | 201122981 A | 7/2011 |
| WO | 2011/125522 A | 10/2011 |

OTHER PUBLICATIONS

Office Action with English translation dated Oct. 30, 2018 issued in corresponding Japanese Application No. 2017-228685, pp. 1-5.

* cited by examiner

TOUCH CIRCUIT, TOUCH SENSING DEVICE, AND TOUCH SENSING METHOD

CROSS-REFERENCE TO RELATED APPLICATION

This application claims priority from Korean Patent Application No. 10-2016-0175041, filed on Dec. 20, 2016, which is hereby incorporated by reference for all purposes as if fully set forth herein.

BACKGROUND

Field of the Disclosure

The present disclosure relates to a display device, and more particularly, to a touch circuit, a touch sensing device, and a touch sensing method.

Description of the Background

With the advent of the information age, display devices for displaying an image are being increasingly required in various forms, and in recent years, various display devices, such as liquid crystal displays (LCDs), plasma display panels (PDPs), and organic light-emitting display devices (OLEDs), have come to be utilized.

Among such display devices, there is a touch display device capable of providing a touch-based input method that allows a user to easily or intuitively and conveniently input information or commands, going beyond the conventional input methods using, for example, a button, a keyboard, a mouse, and the like.

In order to provide a touch-based input method, such a touch display device includes a touch sensing device capable of identifying whether or not a user is performing a touch and accurately detecting touch coordinates (a touch position).

The touch sensing device detects a touch sensing signal by driving touch electrodes disposed on a touch screen panel, and detects touch information (the presence or absence of a touch and a touch position) using the detected sensing signal.

The conventional touch sensing device may generate undesirable parasitic capacitance between touch driving patterns and neighboring conductors inside or outside a touch screen panel in the process of driving and sensing the touch screen panel.

As such, when a touch is sensed based on capacitance, upon the occurrence of parasitic capacitance inside or outside a touch screen panel, touch sensitivity can be greatly lowered. In particular, such a problem becomes more serious when a display panel has a built-in touch screen panel.

SUMMARY

An aspect of the present disclosure is to provide a touch circuit, a touch sensing device, and a touch sensing method, which can obtain accurate sensing data by reducing or eliminating the influence of parasitic capacitance $C_{para}$ occurring inside or outside a touch screen panel, thereby improving the capacitance-based touch sensing performance.

Another aspect of the present disclosure is to provide a touch circuit, a touch sensing device, and a touch sensing method, which can compensate for the change in the quantity of the charge, unintentionally occurring due to parasitic capacitance generated inside or outside the touch screen panel and corresponding to a signal obtained by driving a touch screen panel, thereby obtaining an accurate sensing result (the presence or absence of a touch and/or a touch position).

Still another aspect of the present disclosure is to provide a touch circuit, a touch sensing device, and a touch sensing method, which can obtain an accurate touch sensing result (the presence or absence of a touch and/or a touch position), using sensing data from which noise components have been eliminated by performing control of a signal obtained by driving a touch screen panel, rather than using the same without change.

Still another aspect of the present disclosure is to provide a touch circuit which can control an electric charge input to a preamplifier in the touch circuit, a touch sensing device including the same, and a touch sensing method thereof.

Still another aspect of the present disclosure is to provide a touch circuit including a charge control circuit which can control an electric charge input to a preamplifier in the touch circuit and having a structure in which the area of the charge control circuit decreases, a touch sensing device including the same, and a touch sensing method thereof.

Still another aspect of the present disclosure is to provide a touch circuit including a charge control circuit which can control an electric charge input to a preamplifier in the touch circuit and having a structure such that the area of the charge control circuit is decreased and charge control efficiency is improved, a touch sensing device including the same, and a touch sensing method thereof.

An aspect of the present disclosure may provide a touch circuit including: a preamplifier having an inverting input terminal electrically connectable to a touch screen panel, a non-inverting input terminal to which an input of a touch driving pulse, which is supplied to the touch screen panel, is capable of being applied, and an output terminal for outputting a signal; and a charge control circuit having a first terminal connectable to the inverting input terminal of the preamplifier and a second terminal to which a charge control pulse is applied.

The touch circuit may include M (M≥2) or more preamplifiers. When the touch circuit includes M (M≥2) or more preamplifiers as described above, the first terminal of the charge control circuit may be a shared terminal, which can be connected to the inverting input terminals of two or more preamplifiers among the M or more preamplifiers.

In other words, the first terminal of the charge control circuit may be connected to the inverting input terminals of two or more preamplifiers, among the M or more preamplifiers, through a switch circuit.

The number of charge control circuits may be equal to or less than the number of preamplifiers.

For example, when each of two or more preamplifiers among M or more preamplifiers requires one charge control circuit (e.g. the structure of FIG. 6), only one charge control circuit may be required for two or more preamplifiers.

In another example, when each of two or more preamplifiers among M or more preamplifiers requires two charge control circuits (e.g. the structure of FIG. 13), only one set of two charge control circuits may be required for two or more preamplifiers.

The charge control circuit in the touch circuit may include a capacitor (hereinafter, referred to as a charge control capacitor) having a first terminal and a second terminal.

In addition, the charge control circuit in the touch circuit may further include two or more switching elements for controlling a connection between the inverting input terminals of two or more preamplifiers and the shared first terminal of the charge control capacitor.

In addition, as described above, the charge control circuit in the touch circuit may be a capacitor-based circuit. However, the charge control circuit in the touch circuit may include every circuit configuration in which a voltage of the charge control pulse input to a second terminal is set to be lower or higher than a voltage of the inverting input terminal of the preamplifier, so that a current flow to the inverting input terminal of the preamplifier is controlled, thereby removing electric charge at the inverting input terminal of the preamplifier or injecting an additional electric charge at the inverting input terminal of the preamplifier. For example, the charge control circuit may include a pulse control unit for controlling a charge control pulse input to the second terminal, and one or more switching elements, on/off control of which is performed according to an on/off timing control signal, for performing control of whether to connect the inverting input terminal of the preamplifier and the first terminal. Here, the actual quantity of charge input to the inverting input terminal of the preamplifier may increase or decrease according to the control of an on-off duration length of the switching element.

The charge control circuit described above controls an electric charge input to the inverting input terminal of the preamplifier, so that the quantity of the charge that charges a feedback capacitor of the preamplifier can be controlled.

Another aspect of the present disclosure may provide a touch circuit including: an input/output unit for outputting a touch driving pulse and receiving a signal according to a touch driving pulse; a signal adjustment unit for adjusting the signal received by the input/output unit; and a signal processing unit for receiving an input of the signal adjusted in the signal adjustment unit and generating a sensing value through signal processing thereof.

Still another aspect of the present disclosure may provide a touch sensing method including: supplying a touch driving pulse to a touch screen panel; receiving a signal from the touch screen panel; adjusting the received signal; generating a sensing value through performing signal processing of the adjusted signal; and acquiring touch information based on the sensing value.

Still another aspect of the present disclosure may provide a touch sensing device including: a touch screen panel having a plurality of touch electrodes disposed thereon; and a touch circuit for supplying a touch driving pulse to the plurality of touch electrodes so as to receive a signal.

In the touch sensing device, the touch circuit may include: a preamplifier having an inverting input terminal electrically connectable to a touch screen panel, a non-inverting input terminal to which an input of a touch driving pulse, which is supplied to the touch screen panel, is capable of being applied, and an output terminal for outputting a signal, wherein a feedback capacitor is connected between the inverting input terminal and the output terminal; and a charge control circuit for controlling an electric charge input to the inverting input terminal of the preamplifier.

According to the present disclosure described above, it is possible to provide a touch circuit, a touch sensing device, and a touch sensing method, which can obtain accurate sensing data by reducing or eliminating the influence of parasitic capacitance Cpara occurring inside or outside a touch screen panel, thereby improving capacitance-based touch sensing performance.

Further, according to the present disclosure, it is possible to provide a touch circuit, a touch sensing device, and a touch sensing method, which can compensate for the change in the quantity of the charge, unintentionally occurring due to the parasitic capacitance generated inside or outside the touch screen panel and corresponding to a signal obtained by driving a touch screen panel, thereby obtaining an accurate sensing result (the presence or absence of a touch and/or a touch position).

In addition, according to the present disclosure, it is possible to provide a touch circuit, a touch sensing device, and a touch sensing method, which can obtain an accurate sensing result (the presence or absence of a touch and/or a touch position) using sensing data from which noise component has been eliminated, by performing control of a signal obtained by driving a touch screen panel, rather than using the same without change.

On the other hand, a display panel may have a built-in touch screen, and in this case, effects even greater than those described above can be realized.

In addition, according to the present disclosure, it is possible to provide a touch circuit which can control an electric charge input to a preamplifier in a touch circuit, a touch sensing device including the same, and a touch sensing method thereof.

In addition, according to the present disclosure, it is possible to provide a touch circuit including a charge control circuit which can control an electric charge input to a preamplifier in a touch circuit and having a structure in which the area of the charge control circuit decreases, a touch sensing device including the same, and a touch sensing method thereof.

In addition, according to the present disclosure, it is possible to provide a touch circuit including a charge control circuit which can control an electric charge input to a preamplifier in a touch circuit and having a structure such that the area of the charge control circuit is decreased and charge control efficiency is improved, a touch sensing device including the same, and a touch sensing method thereof.

BRIEF DESCRIPTION OF THE DRAWINGS

The above features and advantages of the present disclosure will be more apparent from the following detailed description taken in conjunction with the accompanying drawings, in which.

DETAILED DESCRIPTION

Figure 1:
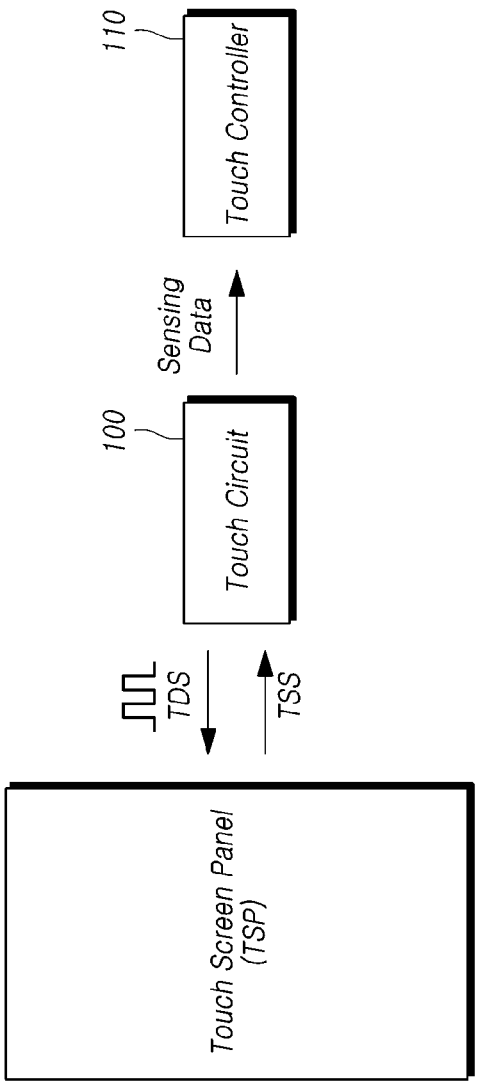
FIG. 1 is a configuration diagram of a touch sensing device according to the present disclosure.

Hereinafter, embodiments of the present disclosure will be described in detail with reference to the accompanying illustrative drawings. In designating elements of the drawings by reference numerals, the same elements will be designated by the same reference numerals even when they are shown in different drawings. Further, in the following description of the present disclosure, a detailed description of known functions and configurations incorporated herein will be omitted when the same may make the subject matter of the present disclosure rather unclear.

In addition, terms, such as "first", "second", "A", "B", "(a)", "(b)" or the like may be used herein when describing components of the present disclosure. Each of these terminologies is not used to define an essence, order or sequence of a corresponding component, but is used merely to distinguish the corresponding component from other component(s). In the case where it is described that a certain structural element "is connected to", "is coupled to", or "is in contact with" another structural element, it should be interpreted that yet another structural element may "be connected to", "be coupled to", or "be in contact with" the structural elements so as to be interposed therebetween, or alternatively that the certain structural element may be directly connected to or may be in direct contact with the other structural element.

Figure 2:
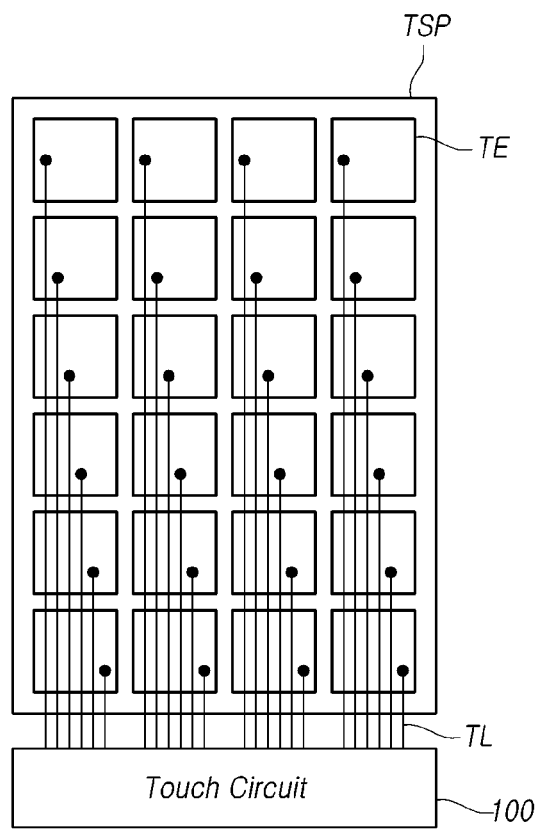
FIG. 2 is a diagram illustrating an exemplary touch screen panel according to the present disclosure.

FIG. 1 is a configuration diagram of a touch sensing device according to the present disclosure, and FIG. 2 is a diagram illustrating an exemplary touch screen panel (TSP) according to the present disclosure.

Referring to FIG. 1, a touch sensing device according to the present disclosure is a device or a system for acquiring touch information relating to the presence or absence of a touch and/or a touch position when a user is performing a touch on a screen in a contact or non-contact manner.

Referring to FIG. 1, a touch sensing device according to the present disclosure may include a touch screen panel TSP having a plurality of touch electrodes TEs disposed thereon, the touch electrode TE corresponding to a touch sensor, and a touch circuit 100 for supplying a touch driving pulse TDS to the plurality of touch electrodes TEs and receiving a touch sensing signal TSS according thereto.

The touch circuit 100 performs signal processing of the received touch sensing signal TSS to generate a sensing value corresponding to a digital value, and outputs sensing data including the generated sensing value.

Here, the signal processing performed by the touch circuit 100 may include amplification processing, integration processing, analog-digital conversion processing, and the like.

In addition, the touch sensing device according to the present disclosure may further include a touch controller 110 that acquires touch information relating to the presence/absence of a touch and/or a touch position, using the sensing data output from the touch circuit 100.

The touch circuit 100 described above may be implemented as one or more touch integrated circuits.

In addition, the touch controller 110 may be implemented as a micro control unit.

The touch controller 110 may be included in the touch circuit 100 or may be configured separately from the touch circuit 100.

The touch sensing device according to the present disclosure may sense a touch based on capacitance formed between touch electrodes, or may sense a touch based on capacitance formed between a touch object, such as a finger or a pen, and a touch electrode.

When the touch sensing device according to the present disclosure senses a touch based on the capacitance formed between the touch electrodes, the plurality of touch electrodes TEs disposed on the touch screen panel TSP may be classified as a driving electrode (also referred to as a transmission electrode), to which a touch driving pulse TDS is applied by the touch circuit 100, and a sensing electrode (also referred to as a reception electrode), where a touch sensing pulse TSS is detected by the touch circuit 100.

In this case, the driving electrode and the sensing electrode may cross each other.

In addition, mutual capacitance is formed between the driving electrode and the sensing electrode.

The touch sensing device according to the present disclosure may acquire touch information on the presence or absence of a touch and/or a touch position based on variation in the mutual capacitance.

When the touch sensing device according to the present disclosure senses a touch based on capacitance formed between a touch electrode and a touch object, such as a finger, a pen, or the like, each of the plurality of touch electrodes TEs disposed on the touch screen panel TSP may operate as a driving electrode (also referred to as a transmission electrode) to which a touch driving pulse TDS is applied by the touch circuit 100, and may operate as a sensing electrode (also referred to as a reception electrode) where a touch sensing pulse TSS is detected by the touch circuit 100.

In this case, the plurality of touch electrodes TEs may be electrically separated from each other.

Self-capacitance is formed between each touch electrode TE and the touch object.

The touch sensing device according to the present disclosure may acquire touch information on the presence or absence of a touch and/or a touch position based on a difference between self-capacitances.

FIG. 2 is a diagram illustrating an exemplary touch screen panel TSP when the touch sensing device acquires touch information based on self-capacitance according to the present disclosure.

Referring to FIG. 2, a plurality of touch electrodes TEs may be disposed on a touch screen panel TSP so as not to overlap each other.

Each touch electrode TE may have one or more openings or no openings.

In addition, a plurality of touch lines TLs for electrically connecting the plurality of touch electrodes TEs and the touch circuit 100 may be disposed on the touch screen panel TSP.

The touch sensing device according to the present disclosure may be a device included in a display device.

The display device may include: a display panel DP on which a plurality of data lines DLs and a plurality of gate lines GLs are disposed and a plurality of subpixels SPs, which are defined by the plurality of data lines DLs and the plurality of gate lines GLs, are disposed; a data driving circuit DDC for driving the plurality of data lines DLs; and a gate driving circuit GDC for driving the plurality of gate lines GLs.

In addition, the display device may further include a controller (not shown) for controlling the data driving circuit DDC and the gate driving circuit GDC.

The data driving circuit DDC may be configured separately from the touch circuit 100 or may be implemented as an integrated circuit together with the touch circuit 100.

Meanwhile, when the touch sensing device is included in the display device, the touch screen panel TSP may be an external type (also referred to as an add-on type) located on the display panel DP, or a type that is built into the display panel DP.

When the display panel DP has a built-in touch screen panel TSP, a set of a plurality of touch electrodes TEs disposed on the display panel DP may be referred to as a touch screen panel TSP.

In the following description, it is assumed that the touch screen panel TSP is a built-in type.

Figure 3:
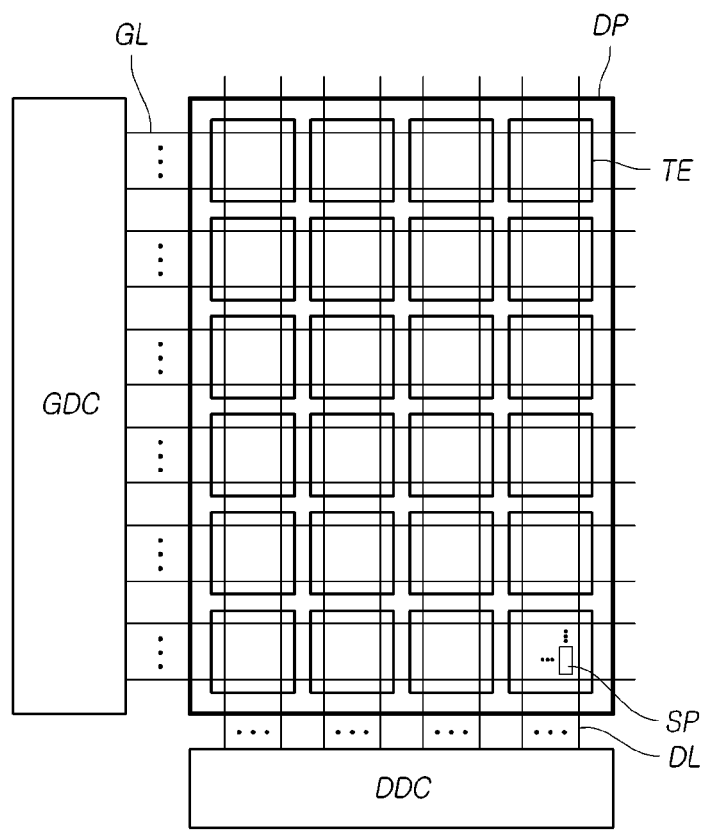
FIG. 3 is a diagram illustrating an exemplary built-in touch screen panel according to the present disclosure.

FIG. 3 is a diagram illustrating an exemplary built-in touch screen panel (TSP) according to the present disclosure.

Referring to FIG. 3, when a display panel DP has a built-in touch screen panel TSP according the present disclosure, the touch screen panel TSP may be an in-cell type, an on-cell type, or the like.

As such, for a built-in touch screen panel TSP, a plurality of touch electrodes TEs may be dedicated touch sensor electrodes, or may be electrodes used for driving a display.

If each of the plurality of touch electrodes TEs disposed on the touch screen panel TSP serves both as the touch sensor electrode and as the display driving electrode, the plurality of touch electrodes TEs may be, for example, a common electrode to which a common voltage Vcom is applied during a display driving period.

That is, during the display driving period, a common voltage Vcom may be applied to all of the plurality of touch electrodes TEs, and during the touch driving period, a touch driving pulse TDS may be sequentially or simultaneously applied to the plurality of touch electrodes TEs.

Meanwhile, one touch electrode TE may have a size larger than that of one sub-pixel SP.

For example, the area of one touch electrode TE may have a size corresponding to the size of areas of two or more sub-pixels SPs.

As described above, when the display panel DP has a built-in touch screen panel TSP, it is not necessary to perform a panel manufacturing process twice and a process of combining two types of panels. In addition, the thickness of the display device can be reduced.

On the other hand, undesirable parasitic capacitance may be formed between the touch electrode TE and/or the touch line TL in the touch screen panel TSP and another signal line, another electrode, or another touch electrode TE in the touch screen panel TSP.

Here, when the display panel DP has a built-in touch screen panel TSP, one or more of a data line DL, a gate line GL, and another touch electrode TE may be connected to the corresponding touch electrode TE, thereby generating undesirable parasitic capacitance.

On the other hand, in a touch driving process, the parasitic capacitance may occur outside the touch screen panel TSP.

In other words, undesirable parasitic capacitance may be formed between an external line electrically connected to a touch line TL in the touch screen panel TSP and another external line.

For example, an external line electrically connected to a touch line TL in the touch screen panel TSP is a line existing outside the touch screen panel TSP, or may be an internal line which is electrically connected to a touch line TL in the touch screen panel TSP and exists in the touch circuit 100.

In addition, an external line electrically connected to a touch line TL in the touch screen panel TSP may be a line existing in a medium (for example, the medium may be a circuit film when the touch circuit 100 or an integrated circuit including the same is designed as a Chip On Film (COF) type) for electrically connecting the touch screen panel TSP and the touch circuit 100.

However, it is possible to reduce the parasitic capacitance generated inside the touch screen panel TSP by applying a touch driving pulse TDS or a signal corresponding thereto to a touch electrode TE disposed in the touch screen panel TSP and/or a conductor (e.g., a data line, a gate line, another touch electrode, etc.) adjacent to a touch line TL.

It is possible to reduce the parasitic capacitance generated outside the touch screen panel TSP by applying a touch driving pulse (TDS) or a signal corresponding thereto to a conductor (for example, another external line or the like) which is electrically connected to a touch line TL of the touch screen panel TSP and is adjacent to an external line existing outside the touch screen panel TSP.

Here, the signal corresponding to the touch driving pulse TDS is a signal, at least one of the frequency, phase, amplitude, etc. of which is the same as those of the touch driving pulse TDS.

As described above, in order to prevent the parasitic capacitance causing a deterioration in touch sensitivity from occurring, when a touch driving pulse TDS is applied to a touch driving pattern (e.g., a touch electrode TE, a touch line TL, an external line electrically connected to the touch line TL, etc.) existing inside or outside the touch screen panel TSP, driving for applying a touch driving pulse TDS or a signal corresponding thereto to another pattern (e.g., a data line, a gate line, another touch electrode, another touch line, another external line, or the like) adjacent to the touch driving pattern is performed, which is referred to as load-free driving.

Through the load-free driving, parasitic capacitance can, to some extent, be prevented from occurring inside or outside the touch screen panel TSP.

However, it is practically impossible to completely prevent the parasitic capacitance from occurring inside or outside the touch screen panel TSP through the load-free driving.

Accordingly, when the parasitic capacitance occurs inside or outside the touch screen panel TSP during a touch driving process, a touch sensing signal TSS, which is received by the touch circuit 100 after the touch driving pulse TDS is applied thereto, may be deteriorated due to the parasitic capacitance in the touch driving process.

Accordingly, a result of touch sensing obtained based on the touch sensing signal TSS (i.e., the presence/absence of a touch and/or touch information relating to a touch position) may have some errors, and the accuracy of touch sensing can be significantly lowered.

Accordingly, during a touch driving process, when the touch sensing signal TSS received by the touch circuit 100 deteriorates due to parasitic capacitance occurring inside or outside the touch screen panel TSP (i.e., when the quantity of the charge corresponding to a touch sensing signal TSS received by the touch circuit 100 increases or decreases compared to a case where the quantity of the charge is normal (i.e. the case of no parasitic capacitance)), the present disclosure performs a charge quantity compensation process for the electric charge corresponding to the touch sensing signal TSS received by the touch circuit 100.

The charge quantity compensation process is a process of reducing or increasing electric charge corresponding to the touch sensing signal TSS received by the touch circuit 100 and inputting the same to the internal circuit of the touch circuit 100.

The influence of parasitic capacitance can be eliminated through the charge quantity compensation process so as to acquire touch information based on the quantity of a charge that can be normally acquired according to the presence or absence of a touch, thereby improving the accuracy of touch sensing.

In the following, in the touch driving process, a touch sensing method that can accurately acquire touch information based on an electric charge, which is adjusted by performing additional electric charge injection to an electric charge corresponding to a touch sensing signal TSS received by the touch circuit 100 or by removing a portion of an electric charge from an electric charge corresponding to a touch sensing signal TSS received by the touch circuit 100, through the charge quantity compensation process, will be described in more detail.

Figure 4:
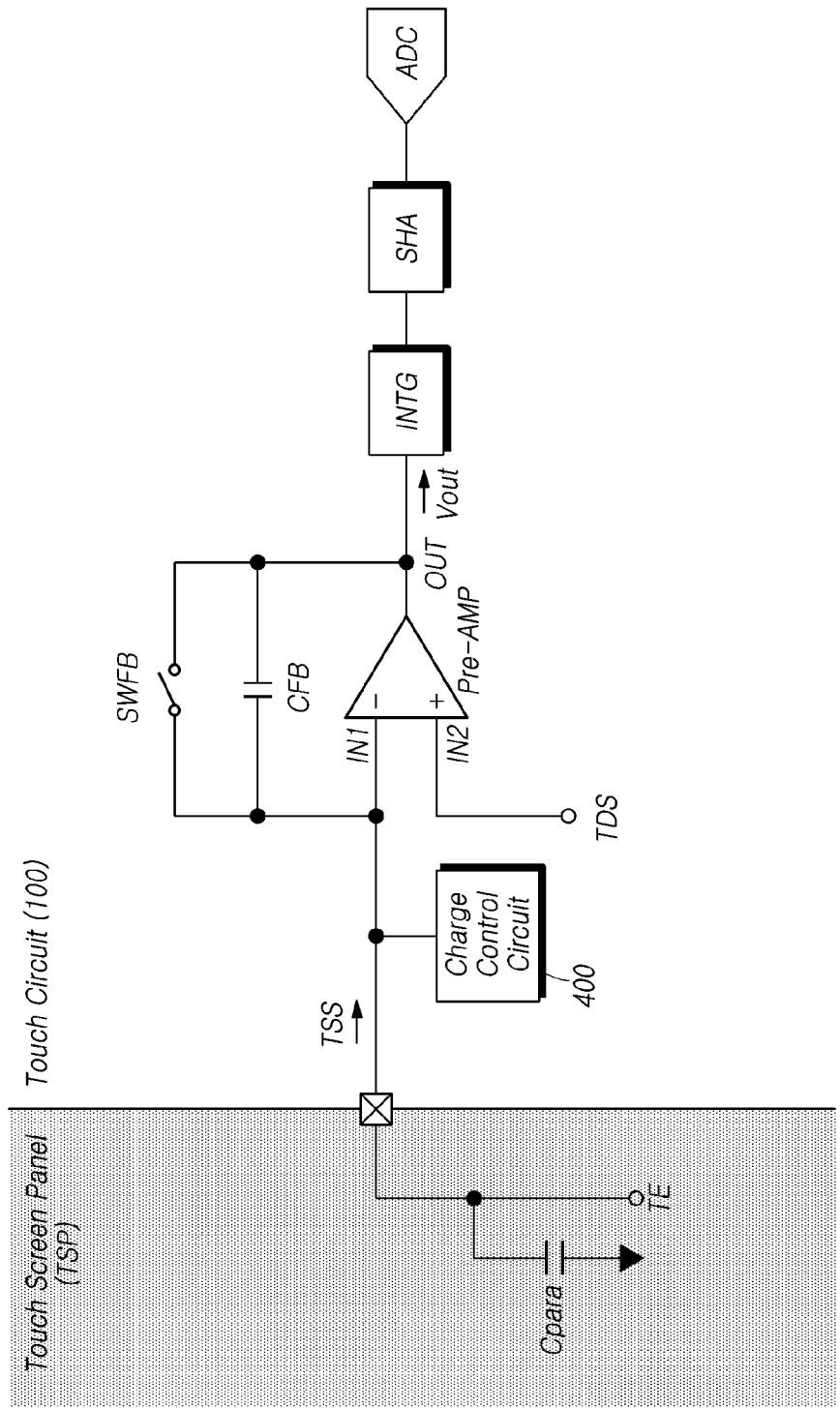
FIGS. 4 and 5 are simplified diagrams of a touch circuit according to the present disclosure.
Figure 5:
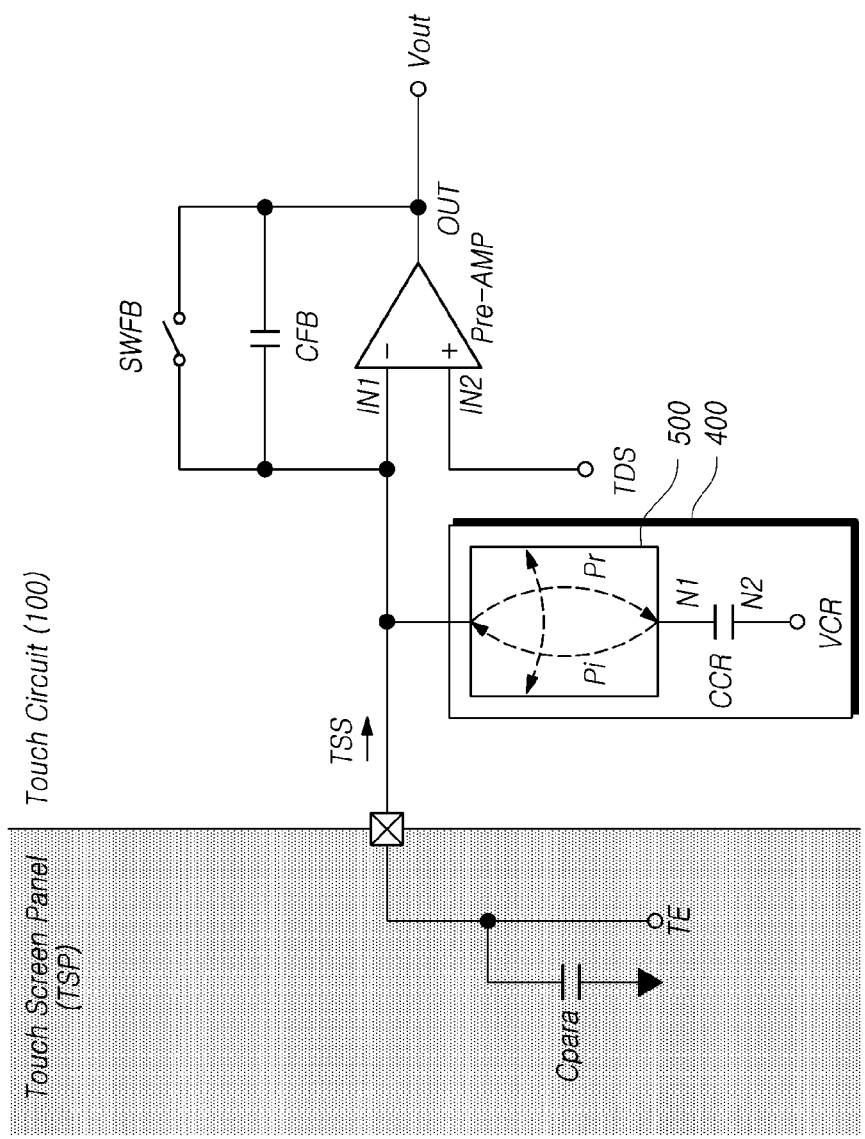

FIGS. 4 and 5 are simplified diagrams of the touch circuit 100 according to the present disclosure.

Referring to FIG. 4, the touch circuit 100 may include a preamplifier Pre-AMP for supplying a touch driving pulse TDS to a touch screen panel TSP and receiving a touch sensing signal TSS from the touch screen panel TSP.

In addition, the touch circuit 100 may further includes an integrator INTG for performing integration of an output signal Vout of the preamplifier Pre-AMP, a sample and hold circuit SHA for storing an output signal Vout of the integrator INTG, and an analog-to-digital converter ADC for converting an analog signal stored in the sample and hold circuit SHA into a digital value so as to generate a sensing value.

The touch circuit 100 may further include another circuit configuration other than the preamplifier Pre-AMP, the integrator INTG, the sample and hold circuit SHA, and the analog-to-digital converter ADC, and a description thereof will be made later.

The preamplifier Pre-AMP includes an inverting input terminal IN1 electrically connectable to the touch screen panel TSP, a non-inverting input terminal IN2 to which an input of a touch driving pulse TDS, which is supplied to the touch screen panel TSP, is capable of being applied, and an output terminal OUT for outputting a signal.

In addition, in the preamplifier Pre-AMP, a feedback capacitor CFB may connect the inverting input terminal IN1 and the output terminal OUT.

In the touch driving process, a touch driving pulse TSP is supplied to a touch electrode TE in the touch screen panel TSP through the pre-amplifier Pre-AMP, and then the electric charge charged in a capacitor between a finger and a touch electrode TE to which a touch driving pulse TSP is applied is received by the touch circuit 100, as a touch sensing signal TSS, and input to the inverting input terminal IN1 of the preamplifier Pre-AMP.

The electric charge corresponding to the touch sensing signal TSS input to the inverting input terminal IN1 of the preamplifier Pre-AMP charges a feedback capacitor CFB.

Accordingly, an output signal Vout, corresponding to the quantity of the charge that is charged in the feedback capacitor CFB, is output to the output terminal OUT of the preamplifier Pre-AMP.

Here, the quantity of the charge input to the inverting input terminal IN1 of the preamplifier Pre-AMP may be the quantity by which the charge undesirably varies due to the parasitic capacitance.

Accordingly, the touch circuit 100 according to the present disclosure may further include a charge control circuit 400 for controlling an increase or a decrease in the quantity of the charge input to the inverting input terminal IN1 of the preamplifier Pre-AMP in order to compensate for variation in the quantity of the charge due to the parasitic capacitance.

The charge control circuit 400 is disposed at the front end of the preamplifier Pre-AMP and may adjust the touch sensing signal TSS received from the outside and input the same to the inverting input terminal IN1 of the preamplifier Pre-AMP so as to adjust the quantity of the charge charged in the feedback capacitor CFB of the preamplifier Pre-AMP.

That is, when an electric charge corresponding to a touch sensing signal TSS received through a touch line TL of the touch screen panel TSP or an external line connected thereto (internal wiring inside the touch circuit 100 or wiring on a circuit film on which the touch circuit 100 is mounted) is input to the inverting input terminal IN1 of the preamplifier Pre-AMP, the charge control circuit 400 may perform control so as to increase the electric charge input to the inverting input terminal IN1 of the preamplifier Pre-AMP by injecting an additional electric charge thereto.

Alternately, when an electric charge corresponding to a touch sensing signal TSS received through a touch line TL of the touch screen panel TSP or an external line connected thereto (internal wiring inside the touch circuit 100 or wiring on a circuit film on which the touch circuit 100 is mounted) is input to the inverting input terminal IN1 of the preamplifier Pre-AMP, the charge control circuit 400 may perform control so as to decrease the electric charge input to the inverting input terminal IN1 of the preamplifier Pre-AMP by removing a portion of the electric charge input to the inverting input terminal IN1 of the preamplifier Pre-AMP.

The charge control circuit 400 controls the actual quantity of charge input to the inverting input terminal IN1 of the preamplifier Pre-AMP, whereby it is possible to prevent an electric charge equal to the extent to which the charge is deteriorated due to the parasitic capacitance from being input to the inverting input terminal IN1 of the preamplifier Pre-AMP, and thus an accurate touch sensing result can be obtained.

Referring to FIG. 5, the charge control circuit 400 in the touch circuit 100 is located at the front end of the preamplifier Pre-AMP.

The charge control circuit 400 adjusts a touch sensing signal TSS received from the outside and inputs the same to the inverting input terminal IN1 of the preamplifier Pre-AMP.

Accordingly, the charge control circuit 400 may control an increase or a decrease in the quantity of the charge charging the feedback capacitor CFB of the preamplifier Pre-AMP.

The charge control circuit 400 may include a charge control capacitor CCR, a control switch circuit 500, and the like.

The charge control capacitor CCR has a first terminal N1 and a second terminal N2.

The first terminal N1 of the charge control capacitor CCR is connected to the control switch circuit 500.

A charge control pulse VCR is applied to the second terminal N2 of the charge control capacitor CCR.

The control switch circuit 500 may control the flow of current between the first terminal N1 of the charge control capacitor CCR and the inverting input terminal IN1 of the preamplifier Pre-AMP.

The control switch circuit 500 is implemented so as to include two or more switching elements.

The control switch circuit 500 may control the switching operation of two or more switching elements so as to selectively establish one of two current paths between the first terminal N1 of the charge control capacitor CCR and the inverting input terminal IN1 of the preamplifier Pre-AMP.

Here, the two current paths include a first current path Pi and a second current path Pr.

The first current path Pi is a path for current flow from the first terminal N1 of the charge control capacitor CCR to the inverting input terminal IN1 of the preamplifier Pre-AMP.

The first current path Pi is a path for current flow for injecting an additional electric charge at the inverting input terminal IN1 of the preamplifier Pre-AMP, in order to increase the quantity of the charge input to the inverting input terminal IN1 of the preamplifier Pre-AMP.

The second current path Pr is a path for current flow from the inverting input terminal IN1 of the preamplifier Pre-AMP to the first terminal N1 of the charge control capacitor CCR.

The second current path Pr is a path for current flow for removing a portion of the electric charge at the inverting input terminal IN1 of the preamplifier Pre-AMP, in order to decrease the quantity of the charge input to the inverting input terminal IN1 of the preamplifier Pre-AMP.

When the charge control circuit 400 is used, it is possible to selectively establish one of two current paths between the first terminal N1 of the charge control capacitor CCR and the inverting input terminal IN1 of the preamplifier Pre-AMP through the control switch circuit 500 so as to effectively control an increase or a decrease in the quantity of the charge actually input to the inverting input terminal IN1 of the preamplifier Pre-AMP and charge the feedback capacitor CFB.

Meanwhile, a touch driving pulse TDS may be toggled between a low level voltage and a high level voltage.

A charge control pulse VCR may be toggled between a low level voltage and a high level voltage.

The touch driving pulse TDS and the charge control pulse VCR are pulse signals including a plurality of pulses, and may be alternating current AC signals.

In the case of touch driving according to the present disclosure, the charge control circuit 400 may be driven by two charge control methods depending on pulsing relationship between the touch driving pulse TDS and the charge control pulse VCR.

The first charge control method of the charge control circuit 400 is a method for operating the charge control circuit 400 while allowing the level change in the charge control pulse VCR to occur once or never during a low level voltage period or a high level voltage period of the touch driving pulse TDS.

The second charge control method of the charge control circuit 400 is a method for operating the charge control circuit 400 while allowing the level change in the charge control pulse VCR to occur two or more times during a low level voltage period or a high level voltage period of the touch driving pulse TDS.

Hereinafter, the first charge control method of the charge control circuit 400 is referred to as a single charge control method, and the second charge control method of the charge control circuit 400 is referred to as a multi charge control method.

In the above description, the charge control circuit 400 has been described briefly, but in the following, detailed circuits and operations of the charge control circuit 400 will be described.

Figure 6:
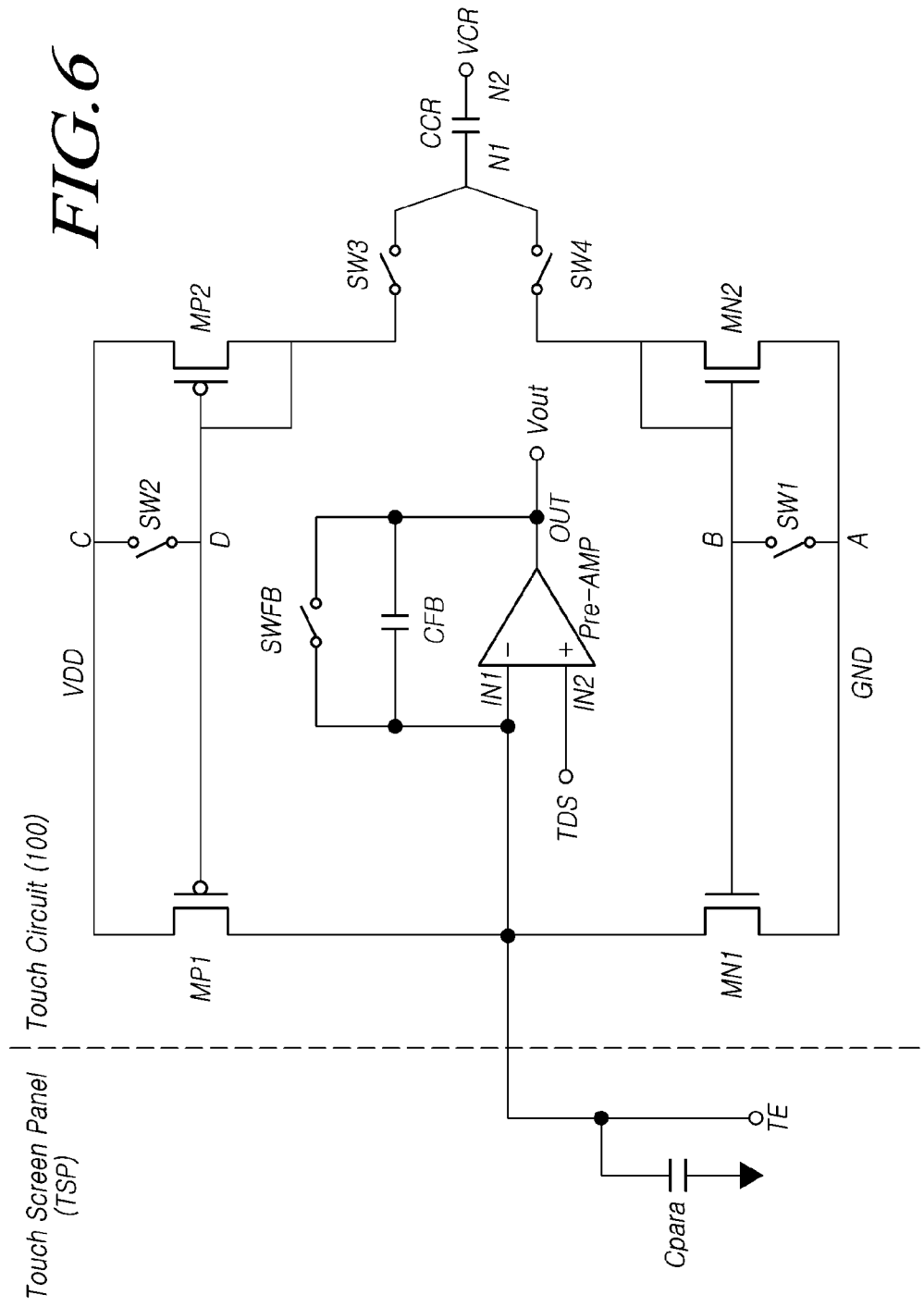
FIG. 6 is a first circuit of a charge control circuit of a touch circuit according to the present disclosure.

FIG. 6 is a first circuit of the charge control circuit 400 of the touch circuit 100 according to the present disclosure.

Referring to FIG. 6, a control switch circuit 500 may include a first P-type transistor MP1, a second P-type transistor MP2, a first N-type transistor MN1, a second N-type transistor MN2, etc.

The first P-type transistor MP1 and the first N-type transistor MN1 are connected to the inverting input terminal IN1 of the preamplifier Pre-AMP and are alternately turned on.

The second P-type transistor MP2 connects the first P-type transistor MP1 and the first terminal N1 of the charge control capacitor CCR.

The second N-type transistor MN2 connects the first N-type transistor MN1 and the first terminal N1 of the charge control capacitor CCR.

A gate node of the first P-type transistor MP1 and a gate node of the second P-type transistor MP2 are connected to each other.

A gate node of the first N-type transistor MN1 and a gate node of the second N-type transistor MN2 are connected to each other.

The four transistors MP1, MP2, MN1, and MN2 have respective roles.

The first P-type transistor MP1 is a transistor for injecting an electric charge at the inverting input terminal IN1 of the preamplifier Pre-AMP.

The second P-type transistor MP2 is a transistor for controlling the quantity of the charge transferred to the first P-type transistor MP1.

The first P-type transistor MP1 and the second P-type transistor MP2 establish a first current path Pi therebetween.

The first N-type transistor MN1 is a transistor for removing an electric charge at the inverting input terminal IN1 of the preamplifier Pre-AMP.

The second N-type transistor MN2 is a transistor for controlling the quantity of the charge removed at the first N-type transistor MN1.

The first N-type transistor MN1 and the second N-type transistor MN2 establish a second current path Pr therebetween.

As described above, when the control switch circuit 500 having four transistors is used, one of two current paths, that is, a first current path Pi for current flow from the first terminal N1 of the charge control capacitor CCR to the inverting input terminal IN1 of the preamplifier Pre-AMP, and a second current path Pr for current flow from the inverting input terminal IN1 of the preamplifier Pre-AMP to the first terminal N1 of the charge control capacitor CCR, is selectively established, so that charge injection or charge removal can be performed at the inverting input terminal IN1 of the preamplifier Pre-AMP.

Referring to FIG. 6, the control switch circuit 500 may include a first switch SW1, a second switch SW2, a third switch SW3, and a fourth switch SW4.

The first switch SW1 may perform control as to whether to connect a point A where the first N-type transistor MN1 and the second N-type transistor MN2 are connected to each other, and a point B where a gate node of the first N-type transistor MN1 and a gate node of the second N-type transistor MN2 are connected to each other.

The second switch SW2 may perform control as to whether to connect a point C where the first P-type transistor MP1 and the second P-type transistor MP2 are connected to each other, and a point D where a gate node of the first P-type transistor MP1 and a gate node of the second P-type transistor MP2 are connected to each other.

The third switch SW3 may perform control as to whether to connect the second P-type transistor MP2 and a first terminal N1 of the charge control capacitor CCR.

The fourth switch SW4 may perform control as to whether to connect the second N-type transistor MN2 and a first terminal N1 of the charge control capacitor CCR.

One of charge injection and charge removal at the inverting input terminal IN1 can be performed depending on switching operations of four switches SW1, SW2, SW3 and SW4 described above.

In the charge control circuit 400 described above, a switching structure for charge injection and a switching structure for charge removal are similar to each other.

Accordingly, the charge control circuit 400 is also referred to as a mirroring charge controller, and is also referred to as a charge remover or a charge injector.

Figure 7:
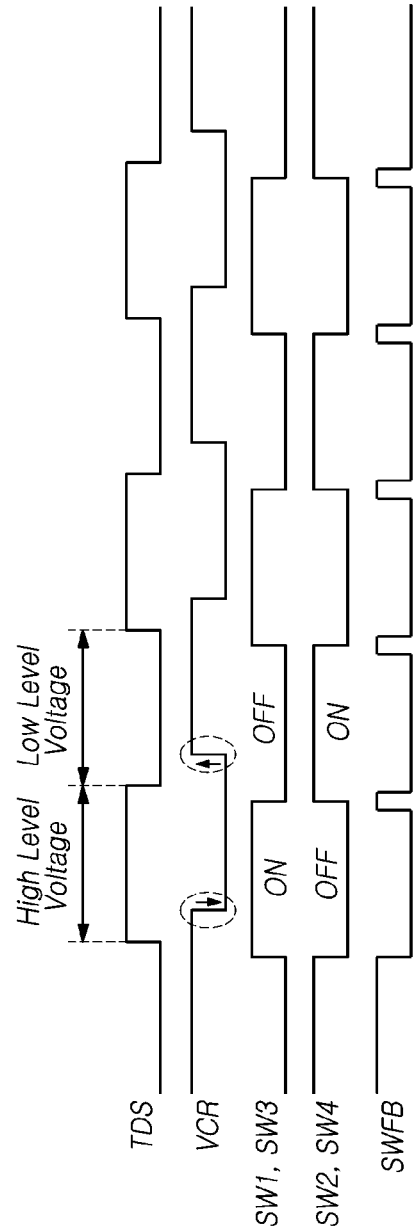
FIG. 7 is a diagram illustrating a driving timing for single charge control of a charge control circuit of a touch circuit according to the present disclosure.
Figure 8:
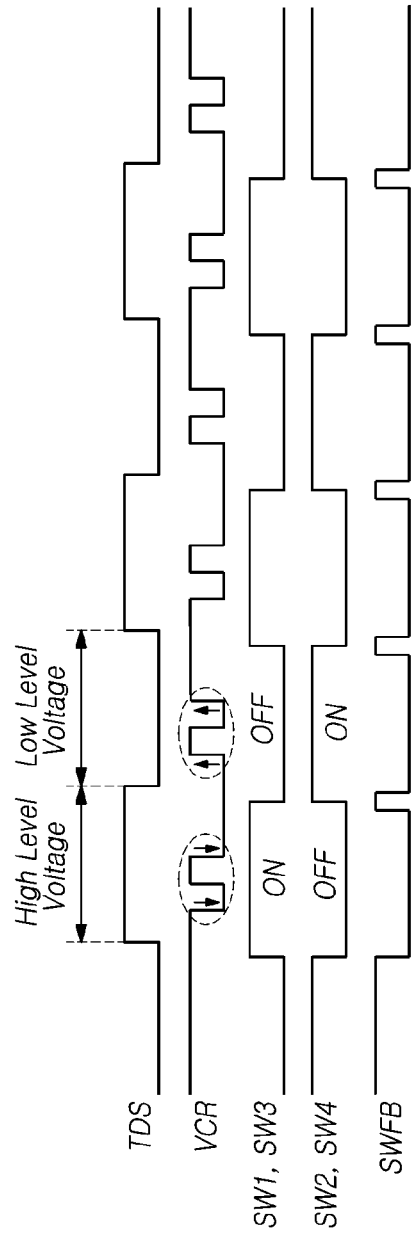
FIG. 8 is a diagram illustrating a driving timing for multi charge control of a charge control circuit of a touch circuit according to the present disclosure.

FIG. 7 is a diagram illustrating a driving timing for single charge control of a charge control circuit 400 of a touch circuit 100 according to the present disclosure. FIG. 8 is a diagram illustrating a driving timing for multi charge control of a charge control circuit 400 of a touch circuit 100 according to the present disclosure.

Referring to FIGS. 7 and 8, the charge control circuit 400 performs the same switching operation regardless of whether the single charge control or the multi-charge control is performed.

Referring to FIGS. 7 and 8, in all or some of high level voltage periods of a touch driving pulse TDS, the first switch SW1 and the third switch SW3 are in an ON state and the second switch SW2 and the fourth switch SW4 are in an OFF state.

Referring to FIGS. 7 and 8, in all or some of low level voltage periods of a touch driving pulse TDS, the first switch SW1 and the third switch SW3 are in an OFF state and the second switch SW2 and the fourth switch SW4 are in an ON state.

In other words, on-off timing of the first switch SW1 and on-off timing of the third switch SW3 correspond to each other.

On-off timing of the second switch SW2 and on-off timing of the fourth switch SW4 correspond to each other.

The on-off timing of the first switch SW1 and the on-off timing of the third switch SW3 are opposite the on-off timing of the second switch SW2 and the on-off timing of the fourth switch SW4, respectively.

The touch circuit 100 may further include a feedback switch SWFB connected to both terminals of the feedback capacitor CFB.

The feedback switch SWFB may be turned on when the level of a touch driving pulse TDS is changed.

A high level voltage period of the touch driving pulse TDS may correspond to an ON period of the first switch SW1 and third switch SW3. A low level voltage period of the touch driving pulse TDS may correspond to an ON period of the second switch SW2 and the fourth switch SW4.

Accordingly, the feedback switch SWFB may be turned on at the on-off timing of the first switch SW1, the second switch SW2, the third switch SW3, and the fourth switch SW4.

As described above, the control switch circuit 500 in the charge control circuit 400 performs the same switching operation regardless of whether single charge control or multi-charge control is being performed. In particular, even when the multi-charge control is performed, the same switching operation as that of the single charge control is performed, so that a control operation is simple.

Hereinafter, a single charge control method of the charge control circuit 400 will be described with reference to FIG. 7.

A touch driving pulse TDS is toggled between a low level voltage and a high level voltage.

A charge control pulse VCR is toggled between a low level voltage and a high level voltage.

The level change in the charge control pulse VCR occurs only once, or does not occur at all during a low level voltage period or a high level voltage period of the touch driving pulse TDS.

That is, the charge control pulse VCR undergoes level change only once or never during a low level voltage period or a high level voltage period of the touch driving pulse TDS.

As described above, the charge control circuit 400 performs single charge control for allowing the level change in the charge control pulse VCR to occur once or never during a low level voltage period or a high level voltage period of the touch driving pulse TDS, so that the supply of the charge control pulse VCR can be facilitated. That is, the charge control can be easily performed through simple driving by the single charge control method.

Referring to FIGS. 6 and 7, when the charge control pulse VCR falls during a high level voltage period (including a rising time point) of the touch driving pulse TDS, the first P-type transistor MP1 conducts a current. Accordingly, electric charge may be additionally injected at the inverting input terminal IN1 of the preamplifier Pre-AMP.

Referring to FIGS. 6 and 7, when the charge control pulse VCR rises during a low level voltage period (including a falling time point) of the touch driving pulse TDS, the first N-type transistor MN1 conducts a current. Accordingly, a portion of the electric charge input to the inverting input terminal IN1 of the preamplifier Pre-AMP is removed.

According to the above description, the control switch circuit 500 may perform control such that current is conducted through the first P-type transistor MP1 in a direction from the charge control capacitor CCR to the inverting input terminal IN1 of the preamplifier Pre-AMP, so that the first current path Pi corresponding to the current injection path may be established.

In addition, the control switch circuit 500 may perform control such that a current is conducted through the first N-type transistor MN1, in a direction from the inverting input terminal IN1 of the preamplifier Pre-AMP to the charge control capacitor CCR, so that the second current path Pr corresponding to the current removal path may be established.

On the other hand, the magnitude of the current conducted through the first P-type transistor MP1 may be determined based on at least one of various control factors including the amplitude of the charge control pulse VCR, the capacitance of the charge control capacitor CCR, and the ratio between the size of the first P-type transistor MP1 and the size of the second P-type transistor MP2.

The magnitude of the current conducted through the first N-type transistor MN1 may be determined based on at least one of control factors including the amplitude of the charge control pulse VCR, the capacitance of the charge control capacitor CCR, and the ratio between the size of the first N-type transistor MN1 and the size of the second N-type transistor MN2.

According to the above description, charge control (i.e. charge injection, charge removal) can be precisely performed by using three control factors including the charge control capacitor CCR, the charge control pulse VCR, and a size ratio (W/L ratio).

Hereinafter, the principle of charge injection at the inverting input terminal IN1 of the preamplifier Pre-AMP will be described in more detail with reference to FIG. 7.

During all or some of high level voltage periods (including a rising time point) of the touch driving pulse TDS, the first switch SW1 and the third switch SW3 are in an ON state and the second switch SW2 and the fourth switch SW4 are in an OFF state.

During a high level voltage period (including a rising time point) of the touch driving pulse TDS, when the charge control pulse VCR falls from a high level voltage to a low level voltage, the change in the charge in the second P type transistor MP2 and the charge control capacitor CCR is represented by mathematical expressions.

When the charge control pulse VCR is at a high level voltage VCR_HIGH, the electric charge (Qcr, VCR_HIGH) charged in the charge control capacitor CCR may be defined by Equation (1) as follows:

$$Qcr, VCR\_HIGH = CCR \times (VDD - VCR\_HIGH) \quad (1)$$

When the charge control pulse VCR is at a low level voltage VCR_LOW, the electric charge (Qcr, VCR=VCR_LOW) charged in the charge control capacitor CCR may be defined by Equation (2) as follows:

$$Qcr, VCR\_LOW = CCR \times (VDD - VCR\_LOW) \quad (2)$$

When the charge control pulse VCR falls from a high level voltage VCR_HIGH to a low level voltage VCR_LOW, the amount of change in the charge ΔQcr in the charge control capacitor CCR is defined by Equation (3) as follows:

$$\Delta Qcr = Qcr, VCR\_LOW - Qcr, VCR\_HIGH = CCR \times (VCR\_HIGH - VCR\_LOW) \quad (3)$$

In a period during which a charge control pulse VCR falls from a high level voltage VCR_HIGH to a low level voltage VCR_LOW, current (Iq=ΔQ/ΔT) flowing per unit time is defined by Equation (4) as follows, and corresponds to current Imp2 flowing per unit time in the second P-type transistor MP2.

$$Iq = \Delta Q/\Delta T = CCR \times (VCR\_HIGH - VCR\_LOW) \quad (4)$$

At this time, the current Imp1 flowing through the first P-type transistor MP1 and the current Imp2 flowing through the second P-type transistor MP2 are defined by equation (5).

$$Imp1 = (1/2) \times K \times \left(\frac{Wmp1}{Lmp1}\right) \times (Vsg - |Vthp|)^2 \quad (5)$$

$$Imp2 = (1/2) \times K \times \left(\frac{Wmp2}{Lmp2}\right) \times (Vsg - |Vthp|)^2$$

In Equation (5), K is μ (hole mobility)×Cox (the size of a gate oxide film per unit area). Wmp1 is a channel width of the first P-type transistor MP1, Lmp1 is a channel length of the first P-type transistor MP1, and Wmp1/Lmp1 corresponds to the size of the first P-type transistor MP1. Wmp2 is a channel width of the second P-type transistor MP2, Lmp2 is a channel length of the second P-type transistor MP2, and Wmp2/Lmp2 corresponds to the size of the second P-type transistor MP2. Vsg is a source-gate voltage, and Vthp is a threshold voltage.

Since a gate voltage of the first P-type transistor MP1 and a gate voltage of the second P-type transistor MP2 are the same, the current Imp1 flowing through the first P-type transistor MP1 can be defined by equation (6) as follows:

$$Imp1 = Imp2 \times \frac{\left(\frac{Wmp1}{Lmp1}\right)}{\left(\frac{Wmp2}{Lmp2}\right)} \quad (6)$$

$$= CCR \times (VCR\_HIGH - VCR\_LOW) \times \frac{\left(\frac{Wmp1}{Lmp1}\right)}{\left(\frac{Wmp2}{Lmp2}\right)}$$

According to Equation (6), the magnitude of the current Imp conducted through the first P-type transistor MP1 may be determined based on at least one of control factors including the amplitude (VCR_HIGH−VCR_LOW) of the charge control pulse VCR, the capacitance of the charge control capacitor CCR, and a ratio (Wmp1/Lmp1)/(Wmp2/Lmp2) between a size Wmp1/Lmp1 of the first P-type transistor MP1 and a size Wmp2/Lmp2 of the second P-type transistor MP2.

Hereinafter, the principle of charge removal at the inverting input terminal IN1 of the preamplifier Pre-AMP will be described in more detail with reference to FIG. 7.

During all or some of low level voltage periods (including a falling time point), the second switch SW2 and the fourth switch SW4 are an ON state and the first switch SW1 and the third switch SW3 are in an OFF state.

During a low level voltage period (including a falling time point) of the touch driving pulse TDS, when the charge control pulse VCR rises from a low level voltage to a high level voltage, the change in the charge in the second N type transistor MN2 and the charge control capacitor CCR is the same as the change in the charge in the second P type transistor MP2 and the charge control capacitor CCR in a high level voltage period of the touch driving pulse TDS.

Therefore, since a gate voltage of the first N-type transistor MN1 and a gate voltage of the second N-type transistor MN2 are the same, the ratio between the current Imn1 flowing through the first N-type transistor MN1 and the current Imn2 flowing through the second N-type transistor MN2 corresponds to the ratio between the size (Wmn1/Lmn1) of the first N-type transistor MN1 and the size (Wmn2/Lmn2) of the second N-type transistor MN2.

The current Imn1 flowing through the first N-type transistor MN1 can be defined by Equation (7) as follows:

$$Imn1 = Imn2 \times \frac{\left(\frac{Wmn1}{Lmn1}\right)}{\left(\frac{Wmn2}{Lmn2}\right)} \quad (7)$$

$$= CCR \times (\text{VCR\_HIGH} - \text{VCR\_LOW}) \times \frac{\left(\frac{Wmn1}{Lmn1}\right)}{\left(\frac{Wmn2}{Lmn2}\right)}$$

In Equation (7), Wmn1 is the channel width of the first N-type transistor MN1, Lmn1 is the channel length of the first N-type transistor MN1, and Wmn1/Lmn1 corresponds to the size of the first N-type transistor MN1. Wmn2 is the channel width of the second N-type transistor MN2, Lmn2 is the channel length of the second N-type transistor MN2, and Wmn2/Lmn2 is the size of the second N-type transistor MN2.

According to Equation (7), the magnitude of the current Imn1 conducted through the first N-type transistor MN1 may be determined based on at least one of control factors including the amplitude (VCR_HIGH–VCR_LOW) of the charge control pulse VCR, the capacitance of the charge control capacitor CCR, and a ratio (Wmp1/Lmp1)/(Wmp2/Lmp2) between the size (Wmp1/Lmp1) of the first N-type transistor MN1 and the size (Wmp2/Lmp2) of the second N-type transistor MN2.

Hereinafter, a multi charge control method of the charge control circuit 400 will be described with reference to FIG. 8.

The touch driving pulse TDS is toggled between a low level voltage and a high level voltage.

The charge control pulse VCR is toggled between a low level voltage and a high level voltage.

The charge control pulse VCR undergoes level change two or more times during one low level voltage period or one high level voltage period of the touch driving pulse TDS.

The charge control can be performed two or more times during one high level voltage period or one low level voltage period of the touch driving pulse TDS through the multi-charge control described above, thereby improving charge control performance.

Referring to FIGS. 6 and 8, during a high level voltage period of the touch driving pulse TDS, when the charge control pulse VCR rises, the first P-type transistor MP1 is turned-off.

During a high level voltage period of the touch driving pulse TDS, when the charge control pulse VCR falls, the first P type transistor MP1 may conduct a current.

Accordingly, an electric charge may be additionally injected at the inverting input terminal IN1 of the preamplifier Pre-AMP.

Referring to FIGS. 6 and 8, when the charge control pulse VCR falls during a low level voltage period of the touch driving pulse TDS, the first N-type transistor MN1 may be turned-off.

When the charge control pulse VCR rises during a low level voltage period of the touch driving pulse TDS, the first N type transistor MN1 may conduct a current.

Accordingly, a portion of the electric charge input to the inverting input terminal IN1 of the preamplifier Pre-AMP may be removed.

According to the above description, the charge control circuit 400 performs control such that electric charge injection at the inverting input terminal IN1 of the preamplifier Pre-AMP is performed two or more times during a high level voltage period of the touch driving pulse TDS, and electric charge removal at the inverting input terminal IN1 of the preamplifier Pre-AMP is performed two or more times during a low level voltage period of the drive pulse TDS, thereby improving charge control performance.

Meanwhile, the magnitude of the current conducted through the first P-type transistor MP1 may be determined based on at least one of control factors including the amplitude (VCR_HIGH–VCR_LOW) of the charge control pulse VCR, the capacitance of the charge control capacitor CCR, and the ratio between the size (Wmp1/Lmp1) of the first P-type transistor MP1 and the size (Wmp2/Lmp2) of the second P-type transistor MP2.

The magnitude of the current conducted through the first N-type transistor MN1 may be determined based on at least one of control factors including the amplitude of the charge control pulse VCR, the capacitance of the charge control capacitor CCR, and the ratio between the size (Wmn1/Lmn1) of the first N-type transistor MN1 and the size (Wmn2/Lmn2) of the second N-type transistor MN2.

According to the above description, charge control (charge injection, charge removal) can be precisely performed using three control factors including the charge control capacitor CCR, the charge control pulse VCR, and a size ratio (W/L ratio).

Hereinafter, in relation to multi charge control, the principle of charge injection at the inverting input terminal IN1 of the preamplifier Pre-AMP will be described in more detail with reference to FIG. 8.

When multi charge control is performed, during all or some of high level voltage periods (including a rising time point) of the touch driving pulse TDS, the first switch SW1 and the third switch SW3 are in an ON state and the second switch SW2 and the fourth switch SW4 are in an OFF state.

The states of switches are the same as the states of switches for single charge control.

During a high level voltage period (including a rising time point) of the touch driving pulse TDS, when the charge control pulse VCR rises from a low level voltage to a high level voltage, the amount of change in the charge ΔQcr flowing through the charge control capacitor CCR is defined by Equation (8) as follows:

$$\Delta Qcr = Qcr, \text{VCR\_HIGH} - Qcr, \text{VCR\_LOW} \quad (8)$$
$$= CCR * (\text{VCR\_HIGH} - \text{VCR\_LOW})$$

According to Equation (8), the driving voltage VDD enables an electric charge to flow through the charge control capacitor CCR, and a gate voltage of the second P-type transistor MP2 instantaneously becomes higher than the driving voltage VDD.

Since a high level voltage of the touch driving pulse TDS is lower than the driving voltage VDD and a gate voltage of the first P type transistor MP1 and a gate voltage of the second P type transistor MP2 are the same, the first P-type transistor MP1 is turned off, so that no electric charge flows therein.

Therefore, when the charge control pulse VCR rises during a high level voltage period (including a rising time point) of the touch driving pulse TDS, the first P-type transistor MP1 is not turned on, so that the first P-type transistor MP1 may not perform charge injection at the inverting input terminal IN1 of the preamplifier Pre-AMP.

However, when the charge control pulse VCR falls during a high level voltage period (including a rising time point) of the touch driving pulse TDS, the first P-type transistor MP1 may perform charge injection at the inverting input terminal IN1 of the amplifier Pre-AMP in the same manner as the single charge control.

Hereinafter, in relation to multi charge control, the principle of charge removal at the inverting input terminal IN1 of the preamplifier Pre-AMP will be described in more detail with reference to FIG. 8.

During all or some of low level voltage periods (including a falling time point) of the touch driving pulse TDS, the second switch SW2 and the fourth switch SW4 are in an ON state and the first switch SW1 and the third switch SW3 are in an OFF state.

The states of switches are the same as in the case of the single charge control.

When the charge control pulse VCR falls from a high level voltage to a low level voltage during a low level voltage period (including a falling time point) of the touch driving pulse TDS, an electric charge flows from a node, to which a ground voltage GND is applied, to the charge control capacitor CCR, and the gate voltage of the second N-type transistor MN2 instantaneously becomes lower than the ground voltage GND.

Since a low level voltage of the touch driving pulse TDS is higher than the ground voltage GND and a gate voltage of the first N-type transistor MN1 and a gate voltage of the second N-type transistor MN2 are the same, the first N-type transistor MN1 is turned off and no electric charge flows.

Therefore, when the charge control pulse VCR falls during a low level voltage period (including a falling time point) of the touch driving pulse TDS, the first N-type transistor MN1 is not turned on, so that the first N-type transistor MN1 may not perform charge removal at the inverting input terminal (IN1) of the preamplifier Pre-AMP.

However, when the charge control pulse VCR rises during a low level voltage period (including a falling time point) of the touch driving pulse TDS, the first N-type transistor MN1 is turned on, so that the first N-type transistor MN1 may perform charge removal at the inverting input terminal (IN1) of the preamplifier Pre-AMP.

Figure 9:
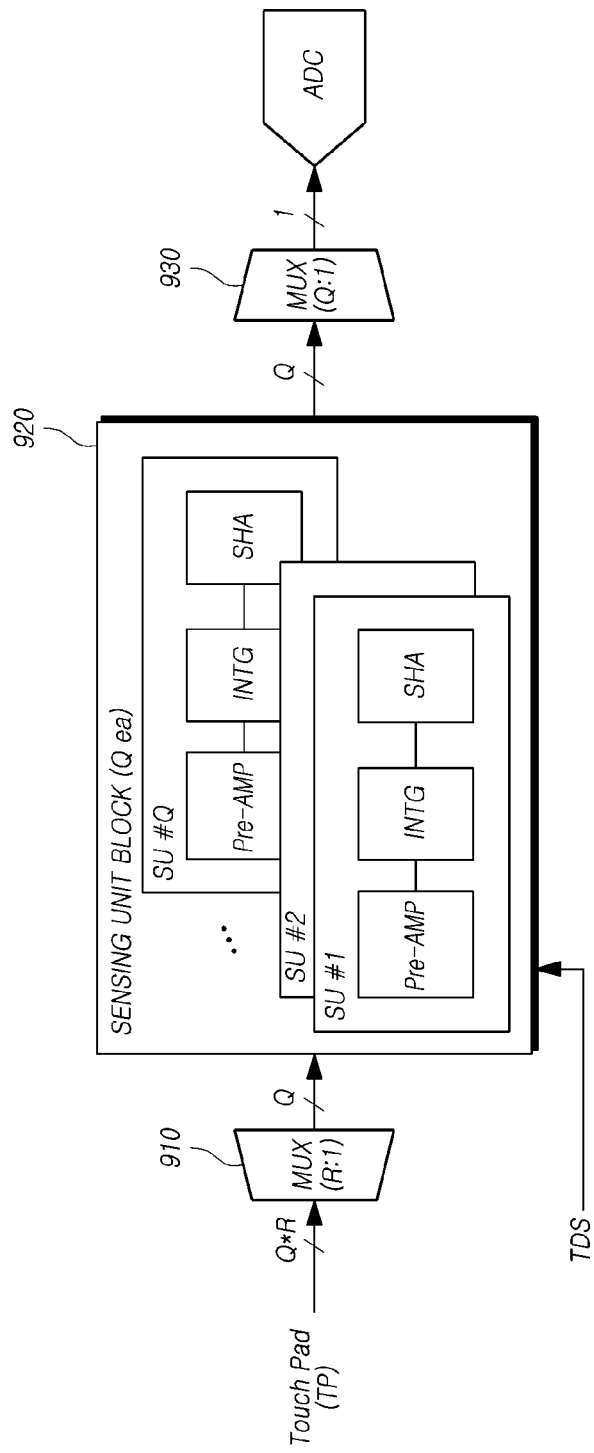
FIG. 9 is a diagram illustrating a first multiplexer circuit, a sensing unit block, a second multiplexer circuit, and an analog-to-digital converter in a touch circuit according to the present disclosure.

FIG. 9 is a diagram illustrating a first multiplexer circuit 910, a sensing unit block 920, a second multiplexer circuit 930, and an analog-to-digital converter ADC in a touch circuit 100 according to the present disclosure.

Referring to FIG. 9, the touch circuit 100 may include a sensing unit block 920 including Q (Q≥2) sensing units (SU #1 to SU #Q).

Each of the Q sensing units (SU #1 to SU #Q) may include a preamplifier Pre-AMP, an integrator INTG for performing integration of an output signal Vout output from the output terminal OUT of the preamplifier Pre-AMP, and a sample and hold circuit SHA for storing an output signal of the integrator INTG.

As described above, the touch circuit 100 uses Q sensing units (SU #1 to SU #Q) capable of simultaneous operation, so that a plurality of touch electrodes TEs disposed on the touch screen panel TSP can be efficiently and quickly driven, and efficient and quick signal detection can be performed.

Referring to FIG. 9, for a more specific example, the touch circuit 100 may include Q*R touch pads TPs connected to a touch screen panel TSP, a first multiplexer circuit 910, a sensing unit block 920 including Q sensing units (SU #1, SU #2, . . . , SU #Q), a second multiplexer circuit 930, and an analog-to-digital converter ADC.

The preamplifier Pre-AMP may output an input touch driving pulse TDS to the corresponding touch electrode TE of the touch screen panel TSP, through a first multiplexer circuit 910.

The first multiplexer circuit 910 is a circuit capable of performing R:1 multiplexing, and may include at least one multiplexer.

The touch driving pulse TDS is transferred to the first multiplexer circuit 910 through the preamplifier Pre-AMP, and is then output to a touch pad TP that corresponds to the corresponding touch channel.

A capacitor is formed between a touch object and a touch electrode TE to which the touch driving pulse TDS is applied through the pre-amplifier Pre-AMP.

The electric charges generated in the capacitor may vary depending on the presence or absence of a touch.

The electric charges generated in the capacitor between the touch object and the touch electrode TE may charge a feedback capacitor CFB of the preamplifier Pre-AMP.

In this regard, the first multiplexer circuit 910 is a circuit capable of performing R:1 multiplexing, and may select Q signals among signals (touch sensing signals TSS) received from Q*R touch pads TPs.

The selected Q signals are transmitted to Q sensing units (SU #1, SU #2, . . . , SU #Q) in the sensing unit block 920 and are input to the integrator INTG through a preamplifier Pre-AMP.

The integrator INTG performs integration of an output voltage Vout of the preamplifier Pre-AMP and outputs a value obtained by performing integration thereof.

The integrator INTG may include elements such as a comparator, a capacitor, and the like. The signal output from the integrator INTG is input to the sample and hold circuit SHA.

The sample-and-hold circuit SHA is a circuit added to an input terminal of the analog-to-digital converter ADC, and performs sampling of the input voltage and holds the same, and maintains the hold input voltage until the analog-to-digital converter ADC completes a previous conversion.

The second multiplexer circuit 930 is a circuit for performing Q:1 multiplexing and may include at least one multiplexer, and selects one of Q sensing units (SU #1, SU #2, . . . , SU #Q) and inputs a voltage for the selected sensing unit, which has been held in the sample and hold circuit SHA, to the analog-to-digital converter (ADC).

The analog-to-digital converter ADC converts the input voltage into a sensing value corresponding to a digital value and outputs the converted sensing value.

Sensing data including the output digital sensing value is transmitted to the touch controller 110.

Figure 10:
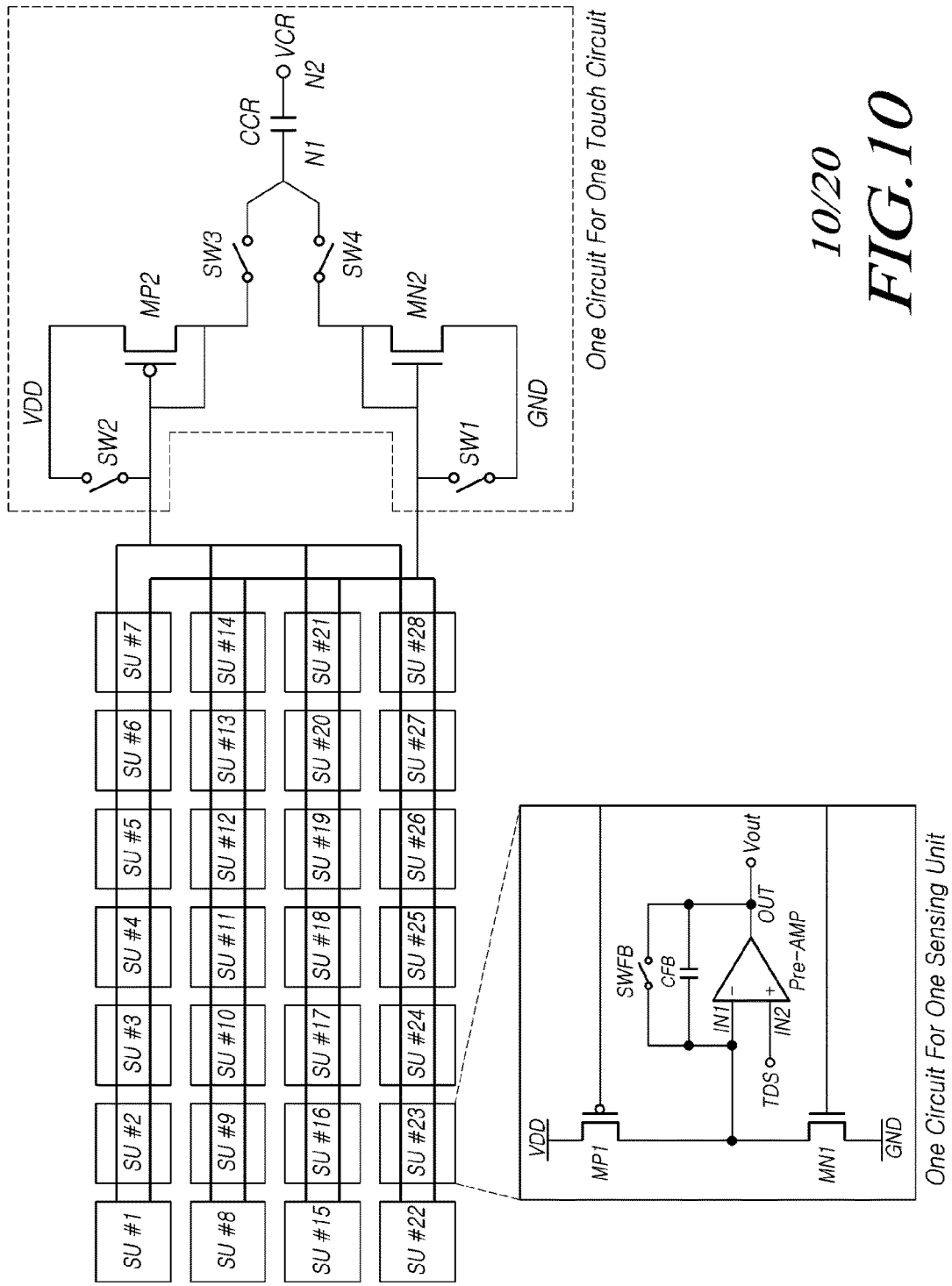
FIG. 10 is a diagram illustrating an arrangement of a charge control circuit of a touch circuit according to the present disclosure.
Figure 11:
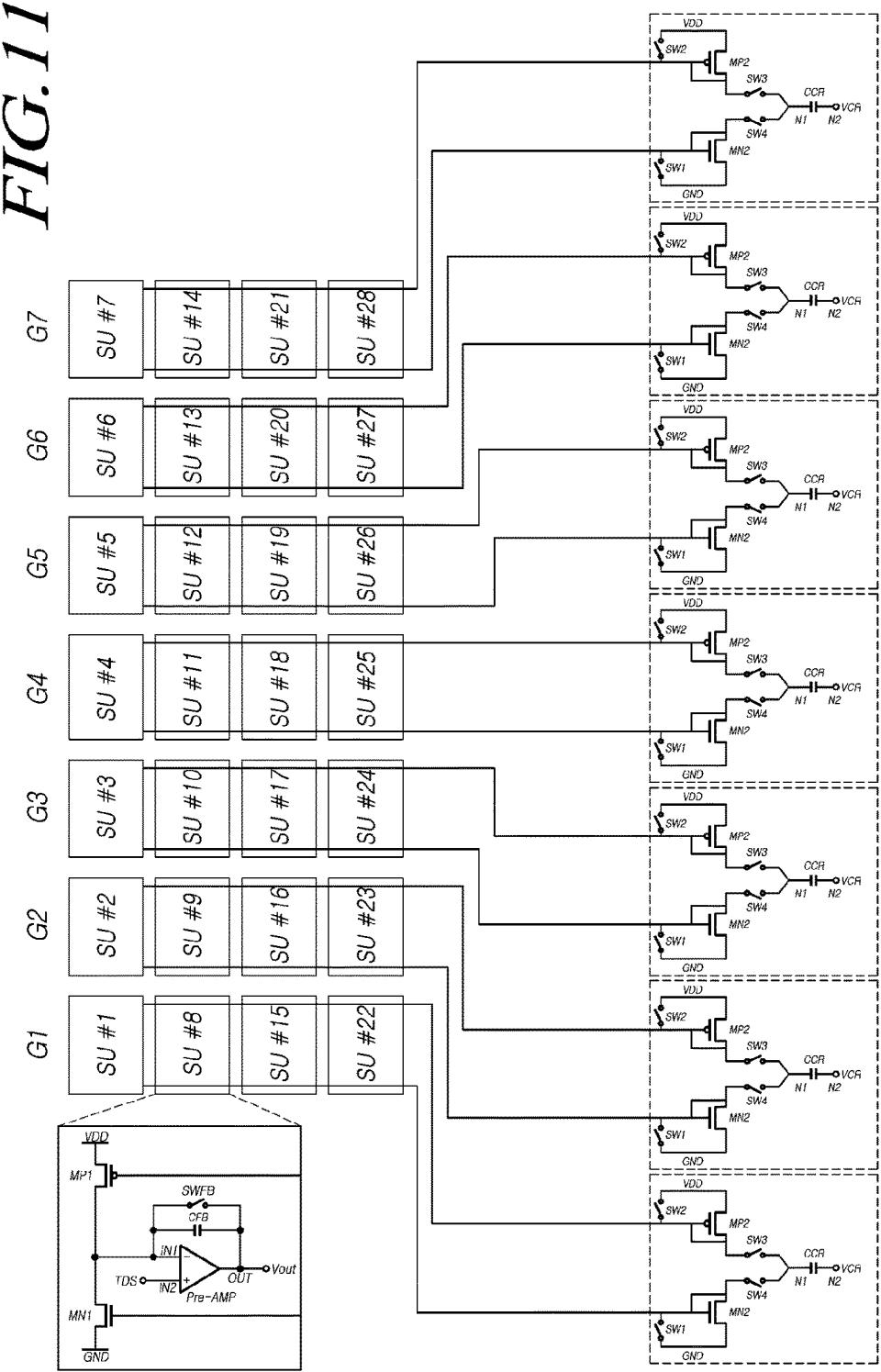
FIG. 11 is a diagram illustrating another arrangement of a charge control circuit of a touch circuit according to the present disclosure.

FIG. 10 and FIG. 11 are diagrams illustrating exemplary arrangements of the charge control circuit 400 of the touch circuit 100 according to the present disclosure.

When a charge control capacitor CCR is provided for each sensing unit, as the number of sensing units is increased, the number of charge control capacitors CCRs and the number of control switch circuits 500 are also increased.

Accordingly, the area of the charge control circuit 400 in the touch circuit 100 becomes large, and the touch circuit 100 also becomes large.

In addition, it is advantageous to increase the capacitance of the charge control capacitor CCR in order to increase the charge control amount of the charge control circuit 400 (that is, the amount of charge removal or the amount of charge injection).

As described above, if the capacitance of the charge control capacitor CCR increases, the size of the touch circuit 100 also increases.

Accordingly, the present disclosure proposes a structure for reducing the area of the charge control circuit 400, and a structure for reducing the area of the charge control circuit 400 and performing charge control for each sensing unit.

FIG. 10 is a diagram illustrating a structure for reducing the area of the charge control circuit 400.

In the example of FIG. 10, Q indicates the number of sensing units, and is equal to 28.

That is, the touch circuit 100 includes 28 sensing units SU #1 to SU #28.

According to the example of FIG. 10, the charge control capacitor CCR is shared with the 28 sensing units (SU #1 to SU #28) and is thus allowed to exist as a single element.

That is, the touch circuit 100 includes only one charge control capacitor CCR.

As described above, the area of the charge control circuit may be decreased by sharing the charge control capacitor CCR in the touch circuit 100 (in the example of FIG. 10, the area decreases by 1/28), and the area of the touch circuit 100 may decrease.

The arrangement structure of the charge control circuit 400 will be described in more detail with reference to the example of FIG. 10.

The first P-type transistor MP1 and the first N-type transistor MN1 may exist in each of the Q (Q=28) sensing units SU #1 to SU #28.

That is, a preamplifier Pre-AMP of each of the 28 sensing units SU #1 to SU #28 may enable charge injection at the inverting input terminal IN1 to be performed or charge removal at the inverting input terminal IN1 to be performed through the Pre-AMP's own unique charge carrier (the first P-type transistor MP1 and the first N-type transistor MN1).

However, each of the second P-type transistor MP2, the second N-type transistor MN2, the first switch SW1, the second switch SW2, the third switch SW3, the fourth switch SW4, and the charge control capacitor CCR is shared with all of the 28 sensing units (SU #1 to SU #28) and is thus allowed to exist as a single element.

That is, the touch circuit 100 includes 28 first P-type transistors MP1s, 28 first N-type transistors MN1s, one second P-type transistor MP2, one second N-Type transistor MN2, one first switch SW1, one second switch SW2, one third switch SW3, one fourth switch SW4, and one charge control capacitor CCR.

As described above, because the switching elements MP2, MN2, SW1, SW2, SW3 and SW4 and the charge control capacitor CCR, excluding charge carriers (the first P-type transistor MP1 and the first N-type transistor MN1) of a preamplifier Pre-AMP of each of the Q sensing units (SU #1 to SU #Q), are shared with all of the Q sensing units (SU #1 to SU #Q), the area of the charge control circuits 400 may largely decrease.

Referring to FIG. 11, Q sensing units SU #1 to SU #Q may be grouped into K (1≤K≤Q) sensing unit SU groups.

In the example of FIG. 11, the number Q of sensing units is 28 and the number K of sensing unit groups is seven.

The touch circuit 100 includes 28 sensing units SU #1 to SU #28.

In addition, 28 sensing units SU #1 to SU #28 are grouped into seven sensing unit groups G1 to G7.

Accordingly, the touch circuit 100 includes seven sensing unit groups G1 to G7.

The charge control capacitors CCR is shared with all of the seven sensing unit groups G1 to G7, so that a single CCR may exist for each of the seven sensing unit groups G1 to G7.

That is, for each of the seven sensing unit groups G1 to G7, one charge control capacitor CCR exists.

As such, since the charge control capacitor CCR is shared by the sensing unit groups in the touch circuit 100, the area of the charge control circuit decreases compared to the case where the charge control capacitor CCR exists for each sensing unit (in the example of FIG. 11, the area decreases by 1/4), and charge control can be performed for each sensing unit group.

With reference to the example of FIG. 11, a structure for decreasing the area of the charge control circuit 400 and performing charge control for each sensing unit will be described.

The first P-type transistor MP1 and the first N-type transistor MN1 in the charge control circuit 400 may exist for each of 28 sensing units SU #1 to SU #28.

That is, a preamplifier Pre-AMP of each of the 28 sensing units (SU #1 to SU #28) enables charge injection or charge removal at the inverting input terminal IN1 to be performed through the Pre-AMP's own charge carrier (the first P-type transistor MP1 and the first N-type transistor MN1).

On the other hand, each of the second P-type transistor MP2, the second N-type transistor MN2, the first switch SW1, the second switch SW2, the third switch SW3, the fourth switch SW4, and the charge control capacitor CCR is shared with all of the seven sensing unit groups (G1 to G7) and is thus allowed to exist as a single element.

That is, the touch circuit 100 may include 28 first P-type transistors MP1, and 28 first N-type transistors MN1, seven second P-type transistors MP2, seven second N-Type transistors MN2, seven first switches SW1, seven second switches SW2, seven third switches SW3, seven fourth switches SW4, and seven charge control capacitors CCRs.

As described above, in the charge control circuit 400, the switching elements MP2, MN2, SW1, SW2, SW3 and SW4 and the charge control capacitor CCR, excluding charge carriers (the first P-type transistor MP1 and the first N-type transistor MN1) of the preamplifier Pre-AMP of each of the Q sensing units (SU #1 to SU #Q), are shared with all of the seven sensing unit groups G1 to G7, so that the area of the charge control circuits 400 decreases, and more detailed charge control can be performed compared to the structure of FIG. 10.

Figure 12:
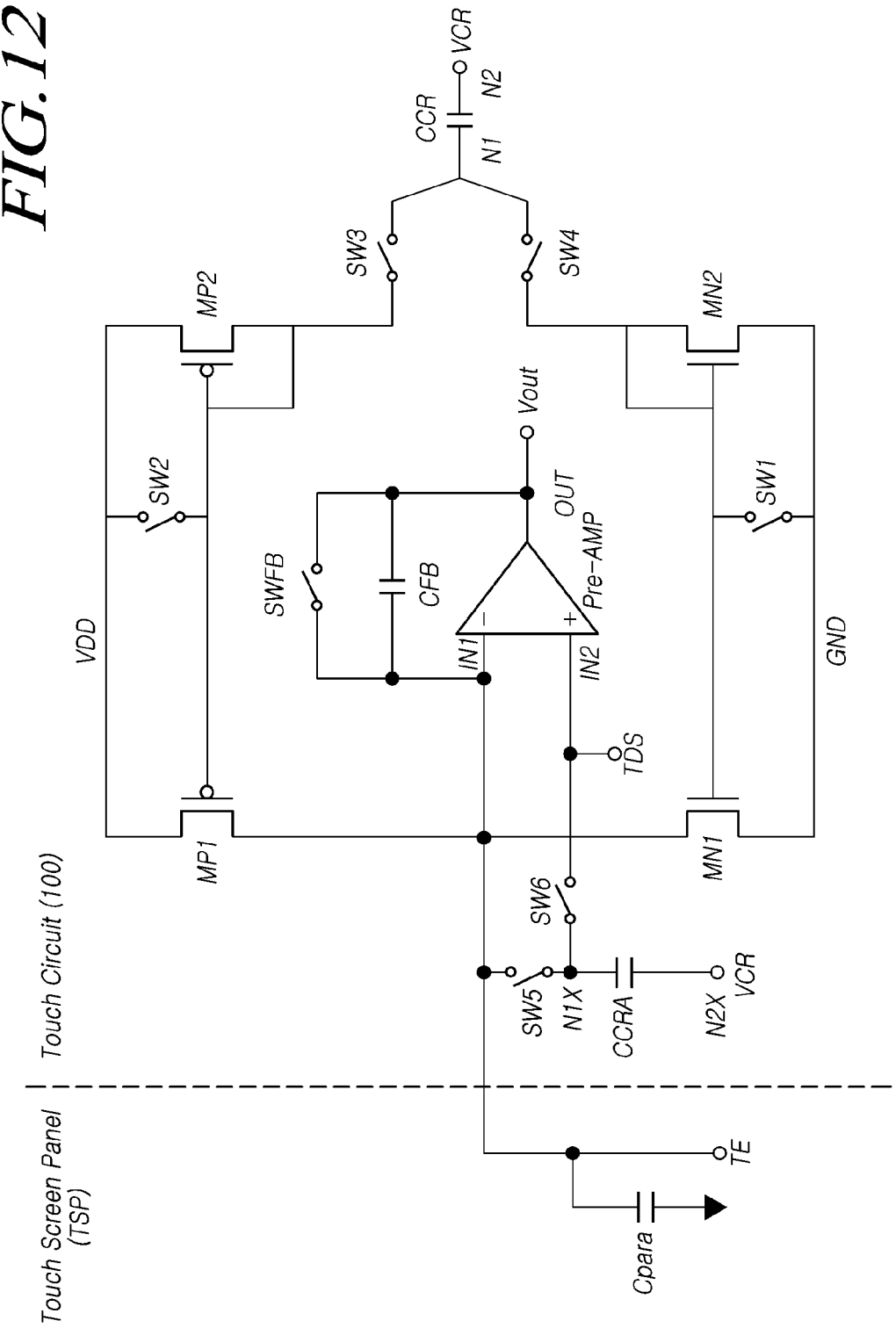
FIG. 12 is a second circuit of a charge control circuit of a touch circuit according to the present disclosure.

FIG. 12 is a second circuit of the charge control circuit 400 of the touch circuit 100 according to the present disclosure.

Referring to FIG. 12, the charge control circuit 400 may further include additional configurations for charge control at the front terminal of the preamplifier Pre-AMP.

The charge control circuit 400 may include an additional charge control capacitor CCRA having a first terminal N1X, and a second terminal N2X to which a charge control pulse VCR is applied.

The charge control circuit 400 may include a fifth switch SW5 for performing control as to whether to connect the first terminal N1X of the additional charge control capacitor CCRA and the inverting input terminal IN1 of the preamplifier Pre-AMP, and a sixth switch SW6 for performing control as to whether to connect the first terminal N1X of the additional charge control capacitor CCR and the non-inverting input terminal IN2 of the preamplifier Pre-AMP.

Through the additional configuration of the charge control circuit, more effective charge control can be performed.

In FIG. 12, the fifth switch SW5 is turned on and then turned off when the touch driving pulse TDS rises, and the fifth switch SW5 is turned on and then turned off when the touch driving pulse TDS falls.

The sixth switch SW6 is turned off and then turned on when the touch driving pulse TDS rises, and the sixth switch SW6 is turned off and then turned on when the touch driving pulse TDS falls.

That is, on-off timing of the sixth switch SW6 is opposite to the on-off timing of the fifth switch SW5.

Referring to FIGS. 13 to 18, additional circuits of the charge control circuit 400 of the touch circuit 100 according to the present disclosure and the driving timing thereof will be described.

Figure 13:
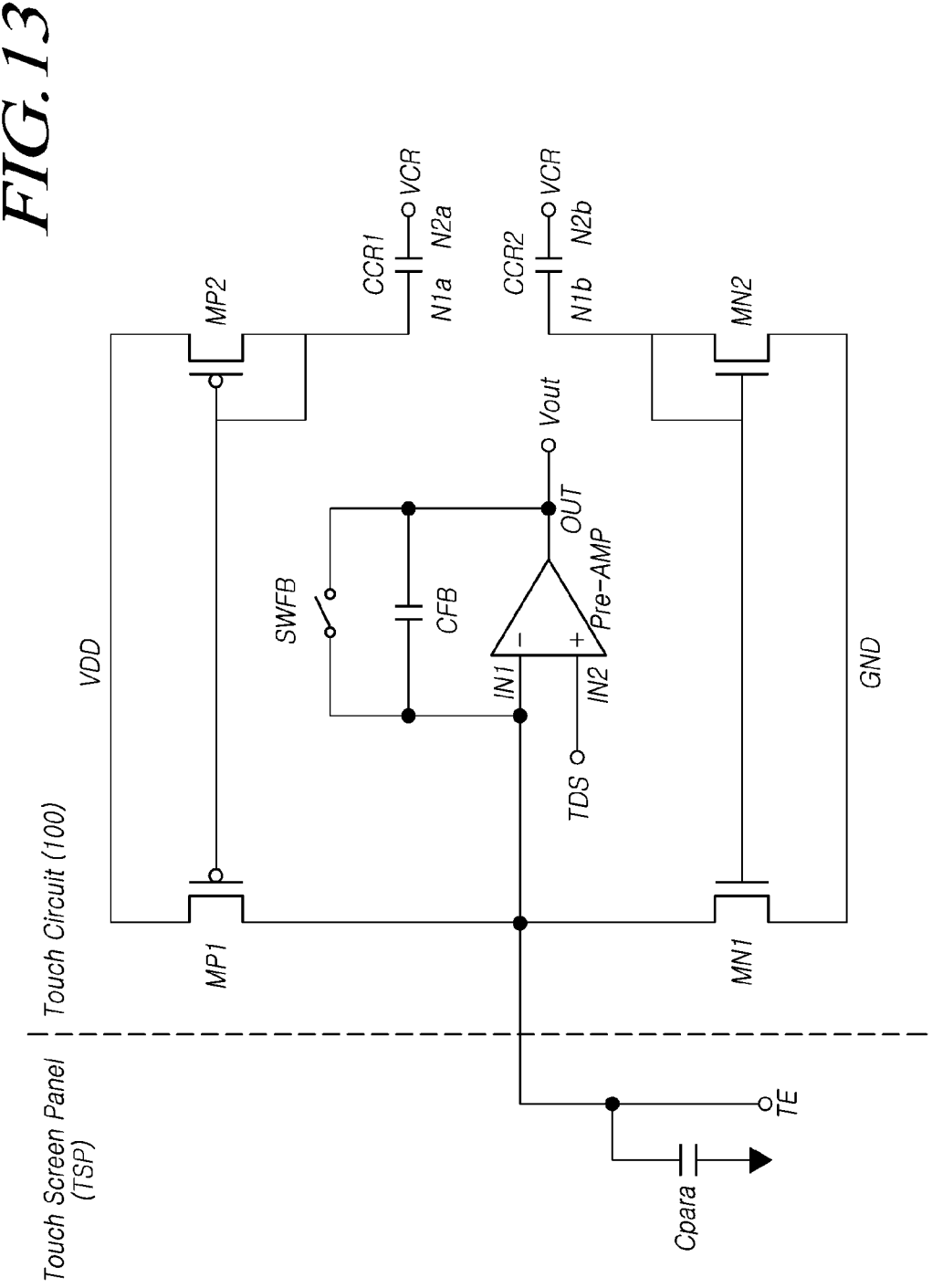
FIGS. 13 and 14 are diagrams illustrating a third circuit and a driving timing of a charge control circuit of a touch circuit according to the present disclosure.
Figure 14:
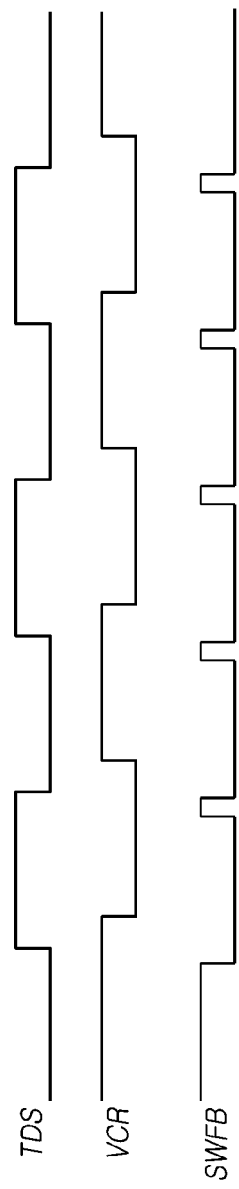
Figure 15:
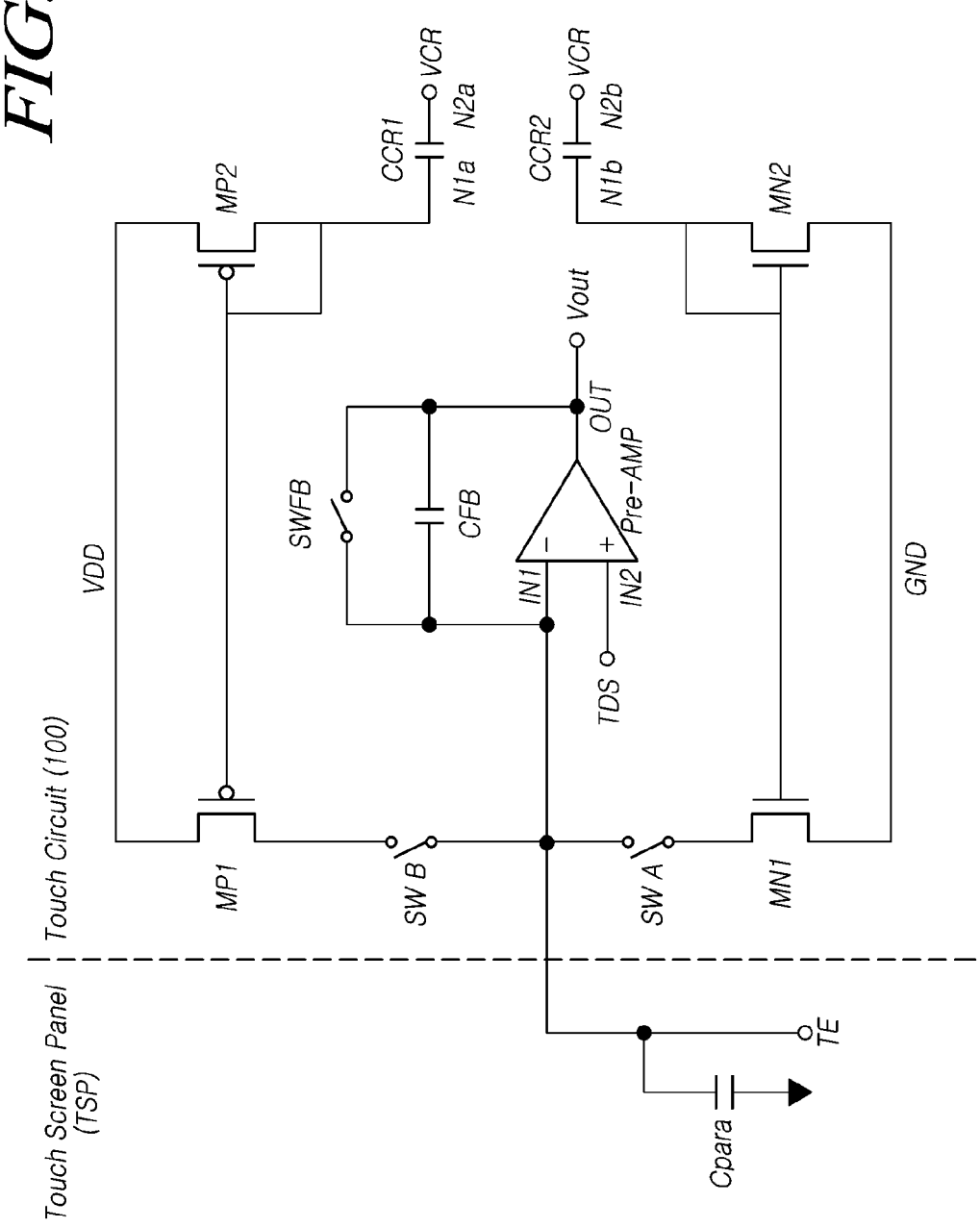
FIGS. 15 and 16 are diagrams illustrating a fourth circuit and a driving timing of a charge control circuit of a touch circuit according to the present disclosure.
Figure 16:
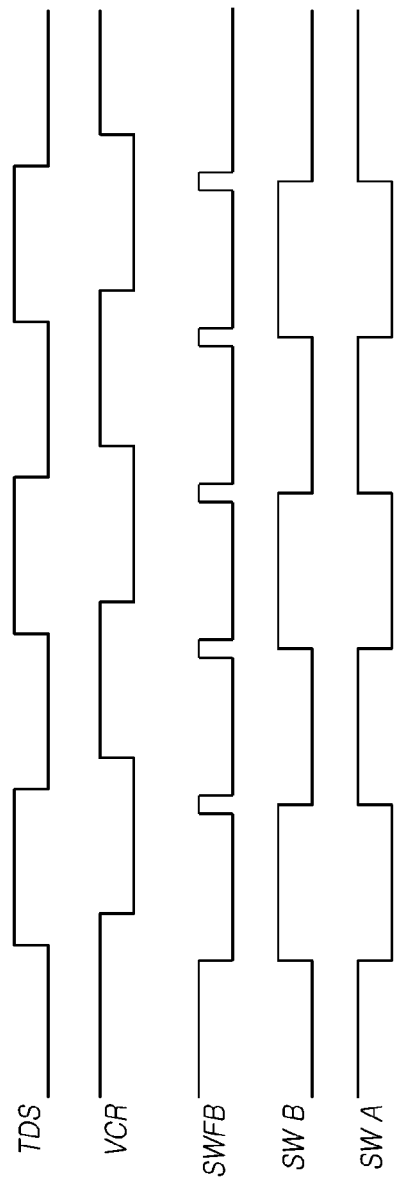
Figure 17:
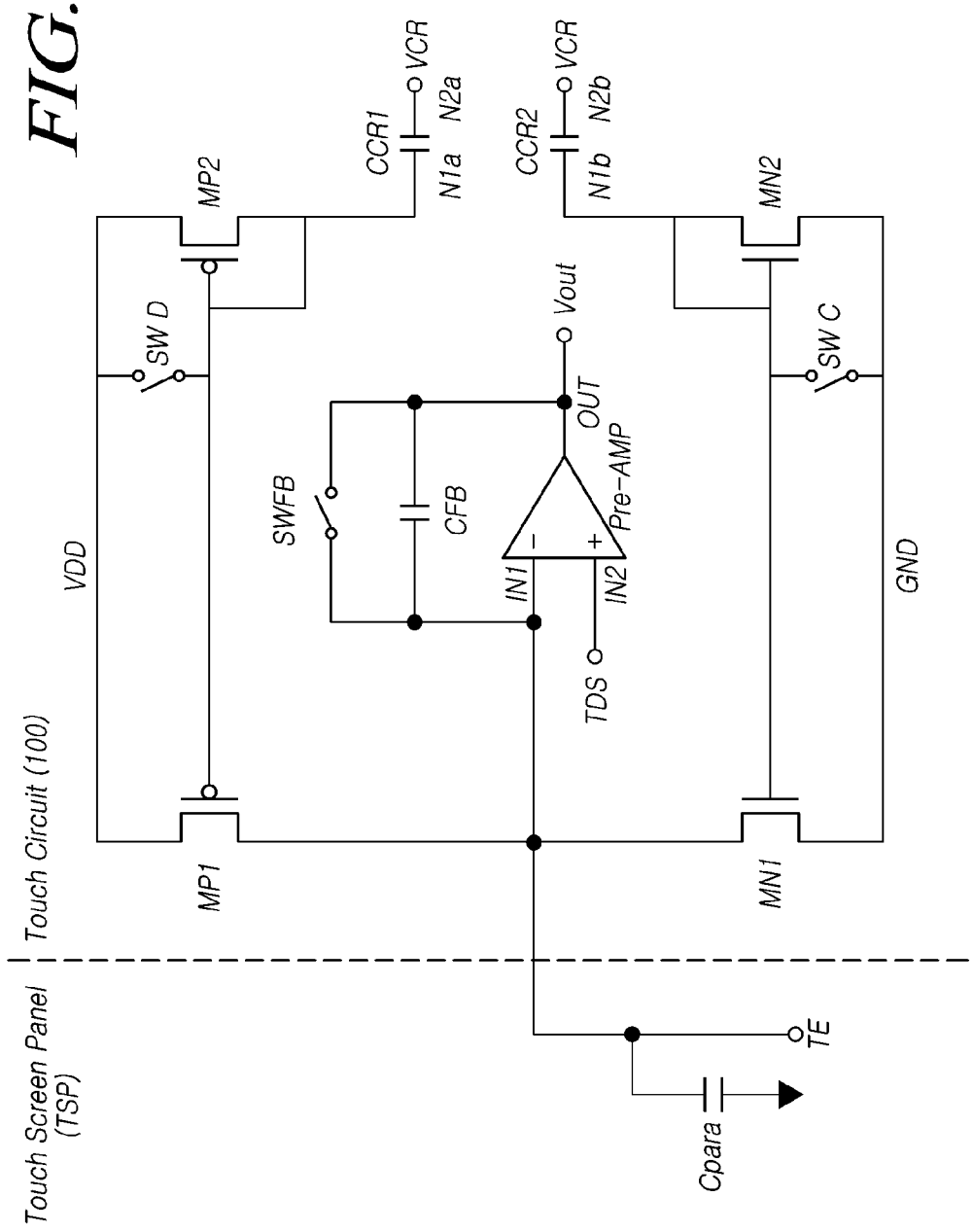
FIGS. 17 and 18 are diagrams illustrating a fifth circuit and a driving timing of a charge control circuit of a touch circuit according to the present disclosure.
Figure 18:
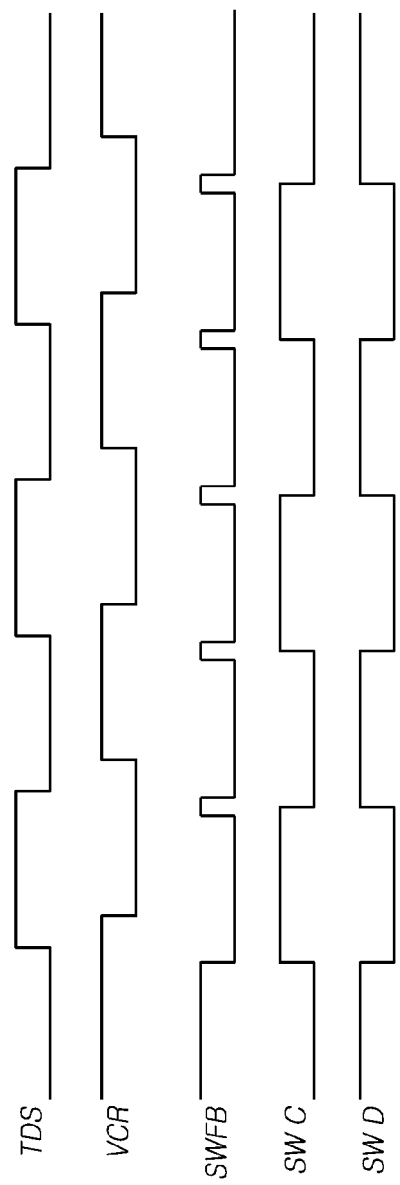

FIGS. 13 and 14 are diagrams illustrating a third circuit and a driving timing of the charge control circuit 400 of the touch circuit 100 according to the present disclosure. FIGS. 15 and 16 are diagrams illustrating a fourth circuit and a driving timing of the charge control circuit 400 of the touch circuit 100 according to the present disclosure. FIGS. 17 and 18 are diagrams illustrating a fifth circuit and a driving timing of the charge control circuit 400 of the touch circuit 100 according to the present disclosure.

Referring to FIGS. 13 to 18, the charge control circuit 400 may include a first charge control capacitor CCR1 having a first terminal N1a, and a second terminal N2a to which a charge control pulse VCR is applied; and a second charge control capacitor CCR2 having a first terminal N1b, and a second terminal N2b to which a charge control pulse VCR is applied.

Referring to FIGS. 13 to 18, the charge control switch 500 of the charge control circuit 400 may include a first P-type transistor MP1 connected to an inverting input terminal IN1 of the preamplifier Pre-AMP and a first N-type transistor MN1 connected to the inverting input terminal IN1 of the preamplifier Pre-AMP.

Referring to FIGS. 13 to 18, the charge control switch 500 of the charge control circuit 400 may include a second P-type transistor MP2 connecting the first P-type transistor MP1 and the first terminal N1a of the first charge control capacitor CCR1, and a second N-type transistor MN2 connecting the first N-type transistor MN1 and the first terminal N1b of the second charge control capacitor CCR2.

A gate node of the first P-type transistor MP1 and a gate node of the second P-type transistor MP2 may be connected to each other.

A gate node of the first N-type transistor MN1 and a gate node of the second N-type transistor MN2 may be connected to each other.

According to the above description, it is possible to effectively perform charge storage for charge injection and charge removal by separately using the charge control capacitor CCR1 for charge injection and the charge control capacitor CCR2 for charge removal.

When a single charge control method is used, a charge control circuit 100 having a structure shown in FIG. 13 can be driven as shown in FIG. 14.

Referring to FIG. 15, the charge control switch 500 of the charge control circuit 400 may include a first switch SW A for performing control as to whether to connect the first N-type transistor MN1 and the inverting input terminal IN1 of the preamplifier Pre-AMP, and a second switch SW B for performing control as to whether to connect the first P-type transistor MP1 and the inverting input terminal IN1 of the preamplifier Pre-AMP.

When a single charge control method is used, the charge control circuit 100 having the structure shown in FIG. 15 can be driven as shown in FIG. 16.

Referring to FIG. 17, the charge control switch 500 of the charge control circuit 400 may further include a third switch SW C for performing control as to whether to connect a point where the first N-type transistor MN1 and the second N-type transistor MN2 are connected to each other with a point where a gate node of the first N-type transistor MN1 and a gate node of the second N-type transistor MN2 are connected to each other, and a fourth switch SW D for performing control as to whether to connect a point where the first P-type transistor MP1 and the second P-type transistor MP2 are connected to each other with a point where a gate node of the first P-type transistor MP1 and a gate node of the second P-type transistor MP2 are connected to each other.

According to the above description, in a structure including a first charge control capacitor CCR1 for charge injection and a second charge control capacitor CCR2 for charge removal, effective charge control can be performed through additional switching elements.

When a single charge control method is used, a charge control circuit 100 having the structure shown in FIG. 17 can be driven as shown in FIG. 18.

FIGS. 13 to 18 can be designed in a structure having first and second charge control capacitors CCR1 and CCR2 shared by two or more preamplifiers Pre-AMPs, in the same manner as shown in FIG. 10 or FIG. 11.

A functional block diagram of the touch circuit 100 described above is shown in FIG. 19.

Figure 19:
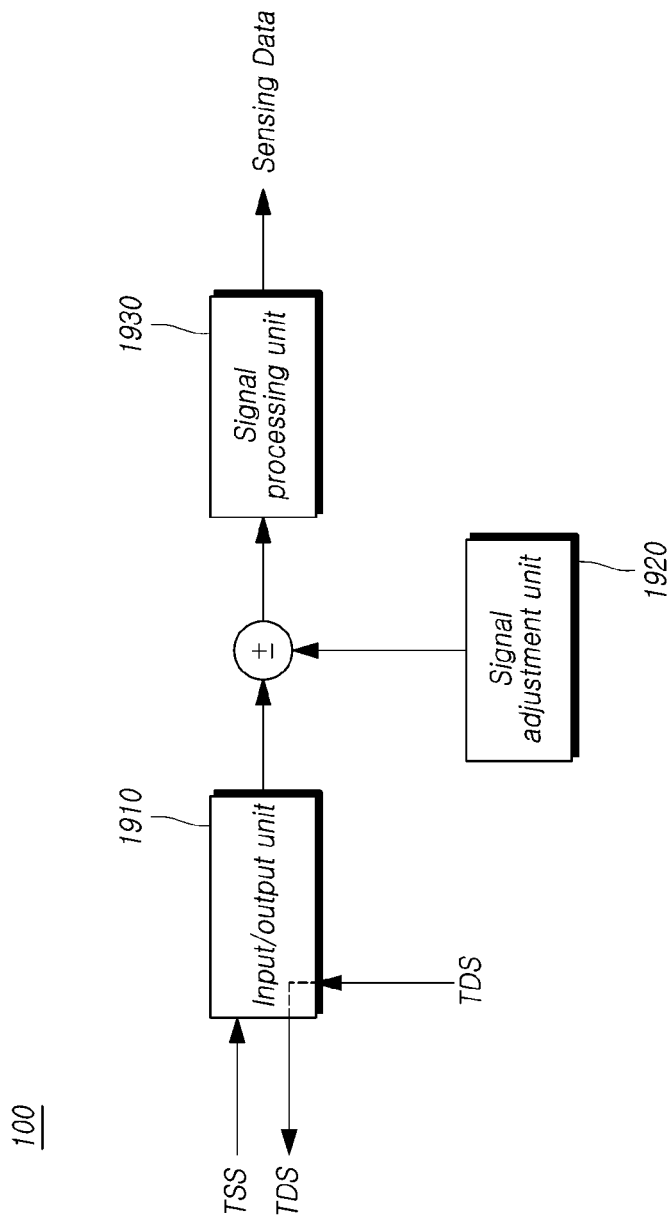
FIG. 19 is a function block diagram of a touch circuit according to the present disclosure.

FIG. 19 is a function block diagram of a touch circuit 100 according to the present disclosure.

Referring to FIG. 19, the touch circuit 100 according to the present disclosure may include an input/output unit 1910 that outputs a touch driving pulse TDS and receives a signal TSS in response to the touch driving pulse TDS, a signal adjustment unit 1920 that adjusts the signal TSS received from the input/output unit 1910, and a signal processing unit 1930 that receives the signal adjusted by the signal adjustment unit 1920 and generates a sensing value through signal processing thereof.

When the touch circuit 100 described above is used, it is possible to generate a sensing value by controlling deterioration of an electric charge by the parasitic capacitance, thereby obtaining an accurate sensing result.

The input/output unit 1910 may include a first multiplexer circuit 910 or the like shown in FIG. 9, as a configuration for signal output and signal reception.

The signal processing unit 1930 may perform signal processing including signal amplification, signal integration, analog-digital conversion processing, and the like.

Accordingly, the signal processing unit 1930 may include a preamplifier Pre-AMP, an integrator INTG, and an analog-to-digital converter ADC.

From the viewpoint of a sensing unit, the signal processing unit 1930 may include a sensing unit block 920, a second multiplexer circuit 930, an analog-to-digital converter ADC, and the like in FIG. 9.

Accordingly, a signal TSS obtained through touch driving may be converted into a signal capable of acquiring touch information, through signal processing thereof.

The signal adjustment unit 1920 is configured so as to correspond to the charge control circuit 400 described above.

The signal adjustment unit 1920 may control (adjust) an electric charge corresponding to the signal TSS received by the input/output unit 1910.

To this end, the signal adjustment unit 1920 may include a charge control capacitor CCR, a control switch circuit 500 for controlling current flow between the inverting input terminal IN1 of the preamplifier Pre-AMP and the charge control capacitor CCR, and the like.

According to the present disclosure, it is possible to prevent a touch sensing error from occurring by controlling a signal (electric charge) input to the signal processing unit 1930, through the signal adjustment unit 1920, and inputting an electric charge, equivalent to the extent of deterioration of the charge due to the parasitic capacitance, to the signal processing unit 1930.

Hereinafter, a touch sensing method according to the present disclosure described above will be briefly described.

Figure 20:
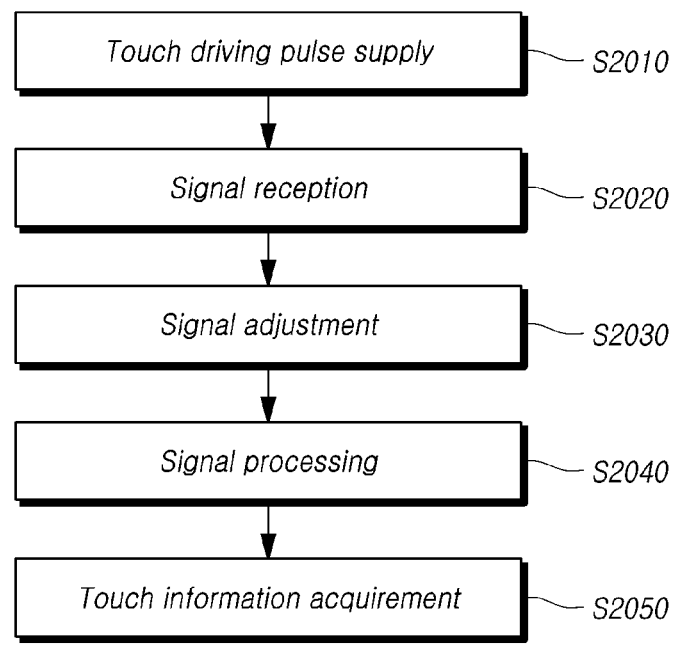
FIG. 20 is a flowchart illustrating a touch sensing method according to the present disclosure.

FIG. 20 is a flowchart illustrating a touch sensing method according to the present disclosure.

Referring to FIG. 20, a touch sensing method according to the present disclosure may include: a touch driving pulse supply step S2010 of supplying a touch driving pulse TDS to a touch screen panel TSP; a signal reception step S2020 of receiving a touch sensing signal TSS from the touch screen panel TSP; a signal adjustment step S2030 of adjusting the received touch sensing signal TSS; a signal processing step S2040 of generating a sensing value by processing the adjusted signal; and a touch information acquirement step S2050 of acquiring touch information based on the sensing value.

Using the touch sensing method described above, when a signal obtained through the touch driving of a touch screen panel TSP is deteriorated by the parasitic capacitance, it is possible to compensate for signal deterioration and prevent a touch sensing error from occurring.

According to the present disclosure described above, it is possible to obtain accurate sensing data by reducing or eliminating the influence of parasitic capacitance Cpara occurring inside or outside the touch screen panel TSP, thereby providing a touch circuit 100 which can improve capacitance-based touch sensing performance, a touch sensing device, and a touch sensing method.

Further, according to the present disclosure, it is possible to provide a touch circuit 100, a touch sensing device, and a touch sensing method, which can compensate a change in the quantity of the charge corresponding to a signal obtained by driving a touch screen panel TSP, which unintentionally occurs due to the parasitic capacitance generated inside or outside the touch screen panel TSP, thereby obtaining an accurate touch sensing result (the presence or absence of a touch and/or a touch position).

In addition, according to the present disclosure, by performing control of a signal obtained by driving a touch screen panel TSP, rather than using the same without change, it is possible to provide a touch circuit 100, a touch sensing device, and a touch sensing method that can obtain an accurate touch sensing result (the presence or absence of a touch and/or a touch position) using sensing data from which a noise component has been eliminated.

In addition, according to the present disclosure, it is possible to provide a touch circuit 100 which can control an electric charge input to a preamplifier Pre-AMP in the touch circuit 100, a touch sensing device including the same, and a touch sensing method thereof.

In addition, according to the present disclosure, it is possible to provide a touch circuit 100 including a charge control circuit 400 capable of controlling an electric charge input to a preamplifier Pre-AMP in the touch circuit 100 and having a structure in which the area of the charge control circuit 400 decreases, a touch sensing device including the same, and a touch sensing method thereof.

In addition, according to the present disclosure, it is possible to provide a touch circuit 100 including a charge control circuit 400 capable of controlling an electric charge input to a preamplifier Pre-AMP in the touch circuit 100 and having a structure in which the area of the charge control circuit 400 decreases and charge control efficiency is improved, a touch sensing device including the same, and a touch sensing method thereof.

The above description and the accompanying drawings provide an example of the technical idea of the present disclosure for illustrative purposes only. Those having ordinary knowledge in the technical field to which the present disclosure pertains will appreciate that various modifications and changes in form, such as combination, separation, substitution, and change of a configuration, are possible without departing from the essential features of the present disclosure. Therefore, the present disclosure disclosed in the present disclosure are intended to illustrate the scope of the technical idea of the present disclosure, but the scope of the present disclosure is not limited to the present disclosure. The scope of the present disclosure shall be understood on the basis of the accompanying claims in such a manner that all of the technical ideas included within the scope equivalent to the claims belong to the present disclosure.

What is claimed is:

1. A touch circuit comprising:
   a preamplifier electrically connected to a touch screen panel supplied with a touch driving pulse, having an inverting input terminal, a non-inverting input terminal, and an output terminal; and
   a charge control circuit comprising:
   a first terminal connectable to the inverting input terminal of the preamplifier and a second terminal to which a charge control pulse is applied,
   wherein, the first terminal of the charge control circuit is a shared terminal, which can be commonly connected to the inverting input terminal of two or more preamplifiers among the M or more preamplifiers when the touch circuit has M (M≥2) or more preamplifiers,
   a charge control capacitor, and
   a control switch circuit configured to control current flow between a first terminal of the charge control capacitor and the inverting input terminal of the preamplifier,
   wherein the control switch circuit comprises,
   a first P-type transistor and a first N-type transistor, which are connected to the inverting input terminal of the preamplifier;
   a second P-type transistor connecting the first P-type transistor and the first terminal of the charge control capacitor and a second N-type transistor connecting the first N-type transistor and the first terminal of the charge control capacitor,
   wherein a gate node of the first P-type transistor and a gate node of the second P-type transistor are connected to each other, and a gate node of the first N-type transistor and a gate node of the second N-type transistor are connected to each other,
   a first switch configured to perform control as to whether to connect a point where the first N-type transistor and the second N-type transistor are connected and a point where the gate node of the first N-type transistor and the gate node of the second N-type transistor are connected, and a second switch configured to perform control as to whether to connect a point where the first P-type transistor and the second P-type transistor are connected and a point where the gate node of the first P-type transistor and the gate node of the second P-type transistor are connected; and a third switch configured to perform control as to whether to connect the second P-type transistor and the first terminal of the charge control capacitor, and a fourth switch configured to perform control as to whether to connect the second N-type transistor and the first terminal of the charge control capacitor.

2. The touch circuit of claim 1, wherein the number of charge control circuits is equal to or less than the number of preamplifiers.

3. The touch circuit of claim 1,
wherein the charge control circuit configured to control an electric charge input to the inverting input terminal of the preamplifier, through charging or discharging of the charge control capacitor.

4. The touch circuit of claim 1, wherein the touch driving pulse is toggled between a low level voltage and a high level voltage, the charge control pulse is toggled between the low level voltage and the high level voltage, and the charge control pulse undergoes level change once or never during one low level voltage period or one high level voltage period of the touch driving pulse.

5. The touch circuit of claim 1, wherein the touch driving pulse is toggled between a low level voltage and a high level voltage, the charge control pulse is toggled between the low level voltage and the high level voltage, and the charge control pulse undergoes level change two or more times during one low level voltage period or one high level voltage period of the touch driving pulse.

6. The touch circuit of claim 3, further comprising:
an integrator performing integration of an output signal output from the output terminal of the preamplifier; and
a sample and hold circuit storing an output signal of the integrator,
wherein the touch circuit includes Q (Q≥2) sensing units when the preamplifier, the integrator, and the sample and hold circuit constitute one sensing unit.

7. The touch circuit of claim 6, wherein the Q sensing units is shared with the charge control capacitor and exists as a single charge control capacitor.

8. The touch circuit of claim 6, wherein the Q sensing units are grouped into K (1≤K≤Q) sensing unit groups, and the charge control capacitor is shared with the K sensing unit groups and exists as a single charge control capacitor for each of the K sensing unit groups.

9. The touch circuit of claim 1, wherein the first switch and the third switch are in an ON state, the second switch and the fourth switch are in an OFF state in at least some of high level voltage periods of the touch driving pulse, and
the first switch and the third switch are in an OFF state, and the second switch and the fourth switch are in an ON state in at least some of low level voltage periods of the touch driving pulse.

10. The touch circuit of claim 1, wherein the touch driving pulse is toggled between a low level voltage and a high level voltage, the charge control pulse is toggled between the low level voltage and the high level voltage, and the charge control pulse undergoes level change once or never during one low level voltage period or one high level voltage period of the touch driving pulse.

11. The touch circuit of claim 10, wherein, during a high level voltage period of the touch driving pulse, when the charge control pulse falls, the first P-type transistor flows a current, so that an electric charge is additionally injected at the inverting input terminal of the preamplifier, and during a low level voltage period of the touch driving pulse, when the charge control pulse rises, the first N-type transistor flows a current, so that a portion of the electric charge input to the inverting input terminal of the preamplifier is removed.

12. The touch circuit of claim 11, wherein a magnitude of the current passing through the first P-type transistor is determined based on one or more of control factors including an amplitude of the charge control pulse, a capacitance of the charge control capacitor, and a ratio between a size of the first P-type transistor and a size of the second P-type transistor, and
a magnitude of the current passing through the first N-type transistor is determined based on one or more of control factors including the amplitude of the charge control pulse, the capacitance of the charge control capacitor, and a ratio between a size of the first N-type transistor and a size of the second N-type transistor.

13. The touch circuit of claim 1, wherein the touch driving pulse is toggled between a low level voltage and a high level voltage, the charge control pulse is toggled between the low level voltage and the high level voltage, and the charge control pulse undergoes level change two or more times during one low level voltage period or one high level voltage period of the touch driving pulse.

14. The touch circuit of claim 13, wherein, during a high level voltage period of the touch driving pulse, when the charge control pulse rises, the first P-type transistor is turned off, and when the charge control pulse falls, the first P-type transistor flows a current, so that an electric charge is additionally injected at the inverting input terminal of the preamplifier, and
during a low level voltage period of the touch driving pulse, when the charge control pulse falls, the first N-type transistor is turned off, and when the charge control pulse rises, the first N-type transistor flows a current, so that a portion of the electric charge input to the inverting input terminal of the preamplifier is removed.

15. The touch circuit of claim 14, wherein a magnitude of the current passing through the first P-type transistor is determined based on one or more of control factors including an amplitude of the charge control pulse, a capacitance of the charge control capacitor, and a ratio between a size of the first P-type transistor and a size of the second P-type transistor, and
a magnitude of the current passing through the first N-type transistor is determined based on one or more of control factors including the amplitude of the charge control pulse, the capacitance of the charge control capacitor, and a ratio between a size of the first N-type transistor and a size of the second N-type transistor.

16. The touch circuit of claim 1, further comprising a feedback switch connected to both terminals of a feedback capacitor connecting the inverting input terminal and the output terminal of the preamplifier,
wherein an on-off timing of the first switch and an on-off timing of the third switch correspond to each other,
an on-off timing of the second switch and an on-off timing of the fourth switch correspond to each other,
the on-off timing of the first switch and the on-off timing of the third switch are opposite the on-off timing of the second switch and the on-off timing of the fourth switch, respectively, and the feedback switch is turned on at the on-off timing of the first switch, the second switch, the third switch, and the fourth switch.

17. The touch circuit of claim 1, further comprising:
an integrator performing integration of an output signal output from an output terminal of the preamplifier; and
a sample and hold circuit storing an output signal of the integrator,
wherein the touch circuit includes Q (Q≥2) sensing units when the preamplifier, the integrator, and the sample and hold circuit constitute one sensing unit,
the first P-type transistor and the first N-type transistor exist for each of the respective Q sensing units, and
each of the second P-type transistor, the second N-type transistor, the first switch, the second switch, the third switch, the fourth switch, and the charge control capacitor is common to the Q sensing units and exists as a single element.

18. The touch circuit of claim 1, further comprising:
an integrator performing integration of an output signal output from an output terminal of the preamplifier; and
a sample and hold circuit storing an output signal of the integrator, wherein the touch circuit comprises Q (Q≥2) sensing units when the preamplifier, the integrator, and the sample and hold circuit constitute one sensing unit,
the Q sensing units are grouped into K (1≤K≤Q) sensing unit groups,
the first P-type transistor and the first N-type transistor exist for each of the respective Q sensing units, and
each of the second P-type transistor, the second N-type transistor, the first switch, the second switch, the third switch, the fourth switch, and the charge control capacitor is common to the K sensing units and exists as a single element.

19. The touch circuit of claim 1, wherein the charge control circuit further comprises:
an additional charge control capacitor having a first terminal, and a second terminal to which the charge control pulse is applied;
a fifth switch configured to perform control as to whether to connect the first terminal of the additional charge control capacitor and the inverting input terminal of the preamplifier; and
a sixth switch configured to perform control as to whether to connect the first terminal of the additional charge control capacitor and the non-inverting input terminal of the preamplifier.

20. The touch circuit of claim 3, wherein, in the charge control circuit, the charge control capacitor comprises:
a first charge control capacitor having a first terminal, and a second terminal to which the charge control pulse is applied; and
a second charge control capacitor having a first terminal, and a second terminal to which the charge control pulse is applied,
wherein the charge control circuit further comprises:
a first P-type transistor connected to an inverting input terminal of the preamplifier;
a first N-type transistor connected to an inverting input terminal of the preamplifier;
a second P-type transistor connecting the first P-type transistor and the first terminal of the first charge control capacitor; and
a second N-type transistor connecting the first N-type transistor and the first terminal of the second charge control capacitor,
a gate node of the first P-type transistor and a gate node of the second P-type transistor are connected to each other, and a gate node of the first N-type transistor and a gate node of the second N-type transistor are connected to each other.

21. The touch circuit of claim 20, wherein the charge control circuit further comprises:
a first switch performing control as to whether to connect the first N-type transistor and the inverting input terminal of the preamplifier; and
a second switch performing control as to whether to connect the first P-type transistor and the inverting input terminal of the preamplifier.

22. The touch circuit of claim 20, wherein the charge control circuit further comprises:
a third switch performing control as to whether to connect a point where the first N-type transistor and the second N-type transistor are connected to each other with a point where the gate node of the first N-type transistor and the gate node of the second N-type transistor are connected to each other; and
a fourth switch performing control as to whether to connect a point where the first P-type transistor and the second P-type transistor are connected to each other with a point where the gate node of the first P-type transistor and the gate node of the second P-type transistor are connected to each other.

23. A touch sensing device comprising:
a touch screen panel having a plurality of touch electrodes disposed thereon; and
a touch circuit supplying a touch driving pulse to the plurality of touch electrodes and receiving a signal,
wherein the touch circuit comprises:
a preamplifier having an inverting input terminal electrically connectable to a touch screen panel, a non-inverting input terminal configured to receive an input of a touch driving pulse to be supplied to the touch screen panel, and an output terminal for outputting a signal; and
a charge control circuit comprising,
a first terminal connectable to the inverting input terminal of the preamplifier,
a second terminal to which a charge control pulse is applied,
wherein the first terminal of the charge control circuit is a shared terminal, which can be commonly connected to the inverting input terminals of the two or more preamplifiers among the M or more preamplifiers when the touch circuit has M (M≥2) or more preamplifiers, and
a control switch circuit configured to control current flow between the first terminal of the charge control circuit and the inverting input terminal of the M (M≥2) or more preamplifiers,
wherein the control switch circuit comprises,
a first P-type transistor and a first N-type transistor, which are connected to the inverting input terminal of the preamplifier;
a second P-type transistor connecting the first P-type transistor and the first terminal of the charge control capacitor and a second N-type transistor connecting the first N-type transistor and the first terminal of the charge control capacitor,
wherein a gate node of the first P-type transistor and a gate node of the second P-type transistor are connected to each other, and a gate node of the first N-type transistor and a gate node of the second N-type transistor are connected to each other, a first switch configured to perform control as to whether to connect a point where the first N-type transistor and the second N-type transistor are connected and a point where the gate node of the first N-type transistor and the gate node of the second N-type transistor are connected, and a second switch configured to perform control as to whether to connect a point where the first P-type transistor and the second P-type transistor are connected and a point where the gate node of the first P-type transistor and the gate node of the second P-type transistor are connected; and a third switch configured to perform control as to whether to connect the second P-type transistor and the first terminal of the charge control capacitor, and a fourth switch configured to perform control as to whether to connect the second N-type transistor and the first terminal of the charge control capacitor.

24. A touch sensing method comprising:
supplying a touch driving pulse to a touch screen panel;
receiving a signal from the touch screen panel;
adjusting the received signal;
generating a sensing value through performing signal processing of the adjusted signal; and
acquiring touch information based on the sensing value,
wherein the touch screen panel includes a charge control circuit including a charge control capacitor, and
a control switch circuit configured to control current flow between a first terminal of the charge control capacitor and an inverting input terminal of a preamplifier, wherein the control switch circuit comprises, a first P-type transistor and a first N-type transistor, which are connected to the inverting input terminal of the preamplifier;

a second P-type transistor connecting the first P-type transistor and the first terminal of the charge control capacitor and a second N-type transistor connecting the first N-type transistor and the first terminal of the charge control capacitor, wherein a gate node of the first P-type transistor and a gate node of the second P-type transistor are connected to each other, and a gate node of the first N-type transistor and a gate node of the second N-type transistor are connected to each other, a first switch configured to perform control as to whether to connect a point where the first N-type transistor and the second N-type transistor are connected and a point where the gate node of the first N-type transistor and the gate node of the second N-type transistor are connected, and a second switch configured to perform control as to whether to connect a point where the first P-type transistor and the second P-type transistor are connected and a point where the gate node of the first P-type transistor and the gate node of the second P-type transistor are connected; and a third switch configured to perform control as to whether to connect the second P-type transistor and the first terminal of the charge control capacitor, and a fourth switch configured to perform control as to whether to connect the second N-type transistor and the first terminal of the charge control capacitor.

\* \* \* \* \*